United States Patent
Blevins et al.

(10) Patent No.: US 11,199,824 B2
(45) Date of Patent: Dec. 14, 2021

(54) REDUCING CONTROLLER UPDATES IN A CONTROL LOOP

(71) Applicant: FISHER-ROSEMOUNT SYSTEMS, INC., Round Rock, TX (US)

(72) Inventors: Terrence L. Blevins, Round Rock, TX (US); Mark J. Nixon, Round Rock, TX (US); Kurtis K. Jensen, Marshalltown, IA (US); Mitchell S. Panther, Marshalltown, IA (US); Deji Chen, Travis, TX (US); Eric D. Rotvold, West St. Paul, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1027 days.

(21) Appl. No.: 14/663,077

(22) Filed: Mar. 19, 2015

(65) Prior Publication Data
US 2015/0192907 A1     Jul. 9, 2015

Related U.S. Application Data

(63) Continuation-in-part of application No. 13/351,802, filed on Jan. 17, 2012, now Pat. No. 9,298,176.
(Continued)

(51) Int. Cl.
*G05B 17/02*     (2006.01)
(52) U.S. Cl.
CPC .................................. *G05B 17/02* (2013.01)
(58) Field of Classification Search
CPC ................................................. G05B 17/02
See application file for complete search history.

(56) References Cited

U.S. PATENT DOCUMENTS

| 3,628,129 A | 12/1971 | Riley |
| 4,149,237 A | 4/1979 | Freitas |

(Continued)

FOREIGN PATENT DOCUMENTS

| CN | 1142735 A | 2/1997 |
| CN | 1192813 A | 9/1998 |

(Continued)

OTHER PUBLICATIONS

Fayolle, et al., An Analytic Evaluation of the Performance of the Send and Wait Protocol, IEEE Transactions on Communications, vol. 26, Issue 3, Mar. 1978 (pp. 313-319), retreived from http://ieeexplore.ieee.org/document/1094065/ on Apr. 29, 2017.*

(Continued)

*Primary Examiner* — Mohammad Ali
*Assistant Examiner* — Joshua T Sanders
(74) *Attorney, Agent, or Firm* — Marshall, Gerstein & Borun LLP

(57) ABSTRACT

A control technique controls a process in a manner that reduces the number of controller changes provided to a controlled device, and so reduces the power consumption of the controlled device along with the loading of a process control communications network disposed between the controller and the controlled device. This technique is very useful in a control system having wirelessly connected field devices, such as sensors and valves which, in many cases, operate off of battery power. Moreover, the control technique is useful in implementing a control system in which control signals are subject to intermittent, non-synchronized or significantly delayed communications and/or in a control system that receives intermittent, non-synchronized or significantly delayed process variable measurements to be used as feedback signals in the performance of closed-loop control.

58 Claims, 9 Drawing Sheets

Related U.S. Application Data

(60) Provisional application No. 61/968,159, filed on Mar. 20, 2014.

(56) References Cited

U.S. PATENT DOCUMENTS

| | | |
|---|---|---|
| 4,152,760 A | 5/1979 | Freitas et al. |
| 4,268,822 A | 5/1981 | Olsen |
| 4,303,973 A | 12/1981 | Williamson, Jr. et al. |
| 4,517,637 A | 5/1985 | Cassell |
| 4,539,655 A | 9/1985 | Trussell et al. |
| 4,726,017 A | 2/1988 | Krum et al. |
| 4,729,091 A | 3/1988 | Freeman et al. |
| 4,837,632 A | 6/1989 | Kubo et al. |
| 4,910,658 A | 3/1990 | Dudash et al. |
| 4,916,441 A | 4/1990 | Gombrich |
| 4,949,299 A | 8/1990 | Pickett |
| 5,088,021 A | 2/1992 | McLaughlin et al. |
| 5,099,444 A | 3/1992 | Wilson et al. |
| 5,142,550 A | 8/1992 | Tymes |
| 5,150,363 A | 9/1992 | Mitchell |
| 5,239,662 A | 8/1993 | Danielson et al. |
| 5,252,967 A | 10/1993 | Brennan, Jr. et al. |
| 5,268,834 A | 12/1993 | Sanner et al. |
| 5,268,835 A | 12/1993 | Miyagaki et al. |
| 5,307,297 A | 4/1994 | Iguchi et al. |
| 5,374,231 A | 12/1994 | Obrist |
| 5,400,246 A | 3/1995 | Wilson et al. |
| 5,400,253 A | 3/1995 | O'Connor |
| 5,451,923 A | 9/1995 | Seberger et al. |
| 5,477,449 A | 12/1995 | Iino et al. |
| 5,493,569 A | 2/1996 | Buchholz et al. |
| 5,495,482 A | 2/1996 | White et al. |
| 5,495,484 A | 2/1996 | Self et al. |
| 5,559,804 A | 9/1996 | Amada et al. |
| 5,581,247 A | 12/1996 | Kelly |
| 5,583,757 A | 12/1996 | Baca, Jr. et al. |
| 5,586,305 A | 12/1996 | Eidson et al. |
| 5,612,890 A | 3/1997 | Strasser et al. |
| 5,657,317 A | 8/1997 | Mahany et al. |
| 5,664,005 A | 9/1997 | Emery et al. |
| 5,666,530 A | 9/1997 | Clark et al. |
| 5,682,476 A | 10/1997 | Tapperson et al. |
| 5,691,896 A | 11/1997 | Zou et al. |
| 5,739,416 A | 4/1998 | Hoenk |
| 5,793,963 A | 8/1998 | Tapperson et al. |
| 5,867,384 A | 2/1999 | Drees et al. |
| 6,043,461 A | 3/2000 | Holling et al. |
| 6,094,602 A | 7/2000 | Schade, III |
| 6,129,449 A | 10/2000 | McCain et al. |
| 6,199,018 B1 | 3/2001 | Quist et al. |
| 6,236,334 B1 | 5/2001 | Tapperson et al. |
| 6,246,320 B1 | 6/2001 | Monroe |
| 6,285,966 B1 | 9/2001 | Brown et al. |
| 6,298,454 B1 | 10/2001 | Schleiss et al. |
| 6,437,692 B1 | 8/2002 | Petite et al. |
| 6,628,579 B2 | 9/2003 | Watanabe et al. |
| 6,775,707 B1 | 8/2004 | Bennett et al. |
| 6,970,183 B1 | 11/2005 | Monroe |
| 7,158,851 B2 | 1/2007 | Funk |
| 7,436,797 B2 | 10/2008 | Shepard et al. |
| 7,460,865 B2 | 12/2008 | Nixon et al. |
| 7,519,012 B2 | 4/2009 | Tapperson et al. |
| 7,587,252 B2 | 9/2009 | Blevins et al. |
| 7,620,460 B2 | 11/2009 | Blevins et al. |
| 7,933,594 B2 | 4/2011 | Nixon et al. |
| 7,945,339 B2 | 5/2011 | Blevins et al. |
| 8,144,622 B2 | 3/2012 | Shepard et al. |
| 8,250,667 B2 | 8/2012 | Svensson et al. |
| 8,396,060 B2 | 3/2013 | Nagashima et al. |
| 8,719,327 B2 | 5/2014 | Blevins et al. |
| 9,298,176 B2 | 3/2016 | Blevins et al. |
| 2002/0125998 A1 | 9/2002 | Petite et al. |
| 2002/0130846 A1 | 9/2002 | Nixon et al. |
| 2003/0043052 A1 | 3/2003 | Tapperson et al. |
| 2003/0093245 A1 | 5/2003 | Schmit |
| 2003/0099221 A1 | 5/2003 | Rhee |
| 2003/0149493 A1 | 8/2003 | Blevins et al. |
| 2003/0171827 A1 | 9/2003 | Keyes et al. |
| 2004/0015609 A1 | 1/2004 | Brown et al. |
| 2004/0103165 A1 | 5/2004 | Nixon et al. |
| 2004/0117766 A1 | 6/2004 | Mehta et al. |
| 2004/0215356 A1 | 10/2004 | Salsbury et al. |
| 2004/0260405 A1 | 12/2004 | Eddie et al. |
| 2005/0062677 A1 | 3/2005 | Nixon et al. |
| 2005/0130605 A1 | 6/2005 | Karschnia et al. |
| 2005/0267710 A1 | 12/2005 | Heavner et al. |
| 2005/0276233 A1 | 12/2005 | Shepard et al. |
| 2006/0074598 A1 | 4/2006 | Emigholz et al. |
| 2006/0077917 A1 | 4/2006 | Brahmajosyula et al. |
| 2006/0079967 A1 | 4/2006 | Roby et al. |
| 2006/0150191 A1 | 7/2006 | Masuda et al. |
| 2006/0227350 A1 | 10/2006 | Crawford et al. |
| 2006/0287769 A1 | 12/2006 | Yanagita et al. |
| 2007/0010898 A1 | 1/2007 | Hosek et al. |
| 2007/0093918 A1 | 4/2007 | Blevins et al. |
| 2007/0112905 A1 | 5/2007 | Blevins et al. |
| 2008/0082180 A1 | 4/2008 | Blevins et al. |
| 2009/0024231 A1 | 1/2009 | Ji et al. |
| 2009/0299495 A1 | 12/2009 | Blevins et al. |
| 2012/0123583 A1 | 5/2012 | Hazen et al. |
| 2013/0013091 A1 | 1/2013 | Cavalcanti et al. |
| 2013/0079899 A1 | 3/2013 | Baramov |
| 2013/0184837 A1 | 7/2013 | Blevins et al. |
| 2014/0359367 A1 | 12/2014 | Friman et al. |

FOREIGN PATENT DOCUMENTS

| | | |
|---|---|---|
| CN | 1313966 A | 9/2001 |
| CN | 1438554 A | 8/2003 |
| CN | 1838309 A | 9/2006 |
| CN | 1955867 A | 5/2007 |
| CN | 1967418 A | 5/2007 |
| CN | 101382797 A | 3/2009 |
| CN | 101572926 A | 11/2009 |
| CN | 101770034 A | 7/2010 |
| CN | 102081397 A | 6/2011 |
| CN | 102141776 A | 8/2011 |
| CN | 102629133 A | 8/2012 |
| CN | 103257625 A | 8/2013 |
| CN | 104065288 A | 9/2014 |
| CN | 104949688 A | 9/2015 |
| DE | 10304902 A1 | 10/2003 |
| DE | 102004029022 | 2/2005 |
| EP | 0 277 006 A2 | 8/1988 |
| EP | 0 491 657 A1 | 6/1992 |
| EP | 0 903 655 A2 | 3/1999 |
| EP | 1030231 A1 | 8/2000 |
| EP | 2 573 631 A1 | 3/2013 |
| GB | 0 321 249 A | 11/1929 |
| GB | 2 283 836 A | 5/1995 |
| GB | 2 431 752 A | 5/2007 |
| GB | 2 440 167 | 1/2008 |
| GB | 2 452 617 A | 3/2009 |
| GB | 2 475 629 A | 5/2011 |
| JP | S59-047609 A | 3/1984 |
| JP | S60164805 A | 8/1985 |
| JP | 1-165609 A | 6/1989 |
| JP | 5-158502 A | 6/1993 |
| JP | 6-035502 A | 2/1994 |
| JP | 6-332506 A | 12/1994 |
| JP | 7-004769 A | 1/1995 |
| JP | 7-098606 | 4/1995 |
| JP | H7-104664 A | 4/1995 |
| JP | 7-160307 A | 6/1995 |
| JP | H08-263103 A | 10/1996 |
| JP | H09-160603 A | 6/1997 |
| JP | 10-224239 A | 8/1998 |
| JP | 11-065609 | 9/2000 |
| JP | 2000-339163 A | 12/2000 |
| JP | 2001-036542 A | 2/2001 |
| JP | 2006-059214 A | 3/2006 |
| JP | 2007-149073 A | 6/2007 |
| JP | 4307608 B2 | 8/2009 |
| JP | 2011-192068 A | 9/2011 |

(56) References Cited

FOREIGN PATENT DOCUMENTS

| | | |
|---|---|---|
| JP | 5252564 B2 | 7/2013 |
| JP | 2013-149253 A | 8/2013 |
| JP | 5-346802 B2 | 11/2013 |
| NZ | 216109 A | 8/1989 |
| NZ | 227231 A | 1/1991 |
| NZ | 239534 A | 11/1993 |
| WO | WO-01/35190 | 5/2001 |
| WO | WO-2004109984 A2 | 12/2004 |
| WO | WO-2006/107933 A1 | 10/2006 |
| WO | WO-2006/133096 A2 | 12/2006 |
| WO | WO-2015/143298 A1 | 9/2015 |

OTHER PUBLICATIONS

Rabi et al., Event-Triggered Strategies for Industrial Control Over Wireless Networks, WICON 2008, retreived from http://www.diva-portal.org/smash/get/diva2:496662/FULLTEXT01 .pdf on Apr. 29, 2017.*
Chen et al., "Similarity-Based Traffic Reducing to Increase Battery Life in a Wireless Process Control Network," (2005). Retrieved from the Internet at: URL:http://knowledge.deltav.com/Controlloop2/media/docs/.
International Search Report and Written Opinion for Application No. PCT/US2015/021713, dated Aug. 12, 2015.
Nixon et al., "Meeting Control Performance Over a Wireless Mesh Network," Automation Science and Engineering, pp. 540-547 (2008).
Office Action for Japanese Application No. 2013-006707, dated Oct. 18, 2016.
Chinese Office Action for Application No. 201310025666.8, dated Jun. 2, 2016.
"Cellular Digital Packet Data Reduces SCADA Costs", reprinted from The American Oil and Gas Reported, Aug. 1997, 4 pages.
"Competency in Process Control—Industry Guidelines," EnTech Control Engineering Inc., Version 1.0, (1994).
"Configuring CL6010, CL6210, and CL7010 Series Interactive and Computing Controllers, FG4.2:CL6011," Fisher Controls publication, pp. 6-46 (1985).
"FloBoss 500 Flow Manager", Fisher Controls International. Inc., 2 pages, Sep. 1996.
"LONMARK Functional Profile: Pressure Sensor" [online], 1997, LONMARK Interoperability Association. Available from http://web.archive.org/web/20030910010803/http://www.lonmark.org/profiles/1030_10.PDF [Accessed Dec. 13, 2012], in particular see passage in section "Send on delta" on pp. 5 and 6.
"The En Tech Report," http://www.emersonprocess.com/solutions/services/entech/publications/index.asp, pp. 1-4 (Oct. 24, 2005).
"The Fisher R0C306 and R0C312", Fisher Controls International, Inc., 2 pages, Jun. 1997.
"The Fisher R0C364.", Fisher Controls International, Inc., 2 pages, Jul. 1996.
Advant® OCS with Master Software, "Functional Units Part 2 AI AO DI DO," User's Guide (1997).
Advant® OCS with Master Software, "Functional Units Part 4 PIDCON RATIOSTN MANSTN," User's Guide (1997).
Advisory Action for U.S. Appl. No. 11/850,810, dated Nov. 28, 2011.
Aspentech, "Analysis of Data Storage Technologies for the Management of Real-Time Process Manufacturing Data," Analysis of Information Management, Retrieved from the Internet Aug. 17, 2007: URL <http://www.aspentech.com/publication_files/White_Paper_for_IP_21.pdf>.
Astrom et al., "Advanced PID Control," ISA, pp. 85-86 (2006).
Astrom et al., "Event Based Control, "Analysis and Design of Nonlinear Control Systems, Springer Verlag, pp. 127-147 (2007).
Blevins et al., "PID Advances in Industrial Control," IFAC Conference on Advances in PID Control PID'12, (2012).
Blevins et al., "PID Control Using Wireless Measurements," IEEE 2014 American Control Conference.
Blevins et al., Control Loop Foundation—Batch and Continuous Processes, ISA, pp. 266, 270, 393.
Caro, "Wireless Networks for Industrial Automation," ISA (2004).
Chen, "Real-Time Data Management in the Distributed Environment," Ph.D. Thesis, University of Texas at Austin (1999).
Chinese Office Action for Application No. 200610149998.7, dated Dec. 4, 2009.
Chinese Office Action for Application No. 200610149999.1, dated Dec. 4, 2009.
Chinese Office Action for Application No. 200810135579.7 dated Sep. 18, 2013.
Chinese Office Action for Application No. 200810135579.7, dated Feb. 13, 2012.
Chinese Office Action for Application No. 201010514547.5, dated Sep. 22, 2011.
Chinese Office Action for Application No. 201110021318.4, dated Dec. 8, 2011.
Communication of a Notice of Opposition for European Application No. 08163662.3, dated Dec. 27, 2011.
D.A. Roberts, "OLCHFA" A Distributed Time-Critical Fieldbus, IEE, UK, London, Digest No. 1993/189, Oct. 1993, pp. 6/1-6/3.
Decision of Refusal for Japanese Application No. 2008-223363, dated Dec. 17, 2013.
Eccles, "IEEE-1451.2 Engineering Units Conversion Algorithm," *Sensors* (1999).
English language translation for Notice of Reasons for Rejection for Japanese Patent Application No. 2006-289675, dated Jul. 31, 2012.
English language translation for Notice of Reasons for Rejection for Japanese Patent Application No. 2006-289928, dated Jul. 31, 2012.
English language translation for Notice of Reasons for Rejection for Japanese Patent Application No. 2009-244331, dated Jul. 31, 2012.
English language translation of Notice of Reasons for Rejection for Japanese Patent Application No. 2008-223363, dated Dec. 4, 2012.
EnTech Control Engineering Inc., "Automatic Controller Dynamic Specification," Available at: URL <http://www.emersonprocess.com/entechcontrol/download/publications/control.pdf>.
European Search Report for Application No. EP08163662.3, dated Jan. 26, 2009.
Examination Report for Application No. GB0620420.0, dated Jun. 22, 2010.
Examination Report for Application No. GB0620421.8, dated Jul. 26, 2010.
Examination Report for Application No. GB0620421.8, dated Mar. 21, 2011.
Examination Report for Application No. GB0816097.0, dated Apr. 24, 2013.
Examination Report for Application No. GB0816097.0, dated Feb. 14, 2012.
Examination Report for Great Britain Patent Application No. GB0816097.0, dated Dec. 18, 2012.
Fourth Office Action, Chinese Patent Application No. 200810135579.7, dated Feb. 21, 2014.
Freescale Semiconductor," Welcome to Freescale Semiconductor," Retrieved from the Internet on Aug. 17, 2007: URL <http://www.freescale.com/>.
Han et al., "Control Over WirelessHART Network," 36th Annual Conference of the IEEE Industrial Electronics Society (2010).
HART Communication Foundation: Common Practice Command Specification, HCF_SPEC-151, Revision 9.0 (2007).
HART Field Communications Protocol, Application Guide, HCF LIT 34 (1999).
Hieb, "Developing a Small Wireless Control Network," Master's Thesis, University of Texas at Austin (2003).
IEC, "Telecontrol Equipment and Systems—Part 5-101: Transmission Protocols—Companion Standard for Basic Telecontrol Tasks," IEC 60870-5-101 (2003).
IEEE, "IEEE Wireless Standards Zone," Retrieved from Internet on Aug. 17, 2007: URL <http://standards.ieee.org/wireless/>.
Japanese Office Action for Application No. 2006-289675, dated Nov. 22, 2011.
Japanese Office Action for Application No. 2006-289928, dated Nov. 22, 2011.

(56) References Cited

OTHER PUBLICATIONS

Japanese Office Action for Application No. 2009-244331, dated Nov. 22, 2011.
Japanese Office action for Patent Application No. Hei 8-513089 dated Sep. 29, 2005.
Johnson, "Vital Link to Process Control," *Control Engineering*, 52(10) (2005).
Lee, "Smart Transducers (Sensors or Actuators), Interfaces, and Networks," Electronic Instrument Handbook, Chapter 47 (2004).
Lian et al., "Network design consideration for distributed control systems" IEEE Transactions on Control Systems Technology, 10(2):297-307 (2002).
Liptak, Bela G., "Sample-and hold Algorithms," *Instrument Engineers Handbook*, Third Edition, Process Control, p. 29 (1995).
LonMark® Functional Profile: Pressure Sensor, Version 1.0, Pressure Sensor: 1030 (1997).
LonMark® Functional Profile: Pump Controller, Version 1.0, Pump Controller: 8120 (2003).
Miskowicz, "Send-On-Delta Concept: An Event-Based Data Reporting Strategy," *Sensors*, 6:49-63 (2006).
Montestruque et al., "On the Model-Based Control of Networked Systems," *Automatica*, 39:1837-1843 (2003).
Montestruque et al., "Stability of Model-Based Networked Control Systems with Time-Varying Transmission Times," *IEEE Transactions on Automatic Control*, 49.9:1562-1572 (2004).
Office Action for U.S. Appl. No. 11/258,676, dated May 12, 2008.
Office Action for U.S. Appl. No. 11/258,676, dated Sep. 17, 2008.
Office Action for U.S. Appl. No. 11/499,013, dated Sep. 18, 2008.
Office Action for U.S. Appl. No. 11/850,810, dated Dec. 10, 2010.
Office Action for U.S. Appl. No. 11/850,810, dated Jun. 28, 2011.
Office Action for U.S. Appl. No. 11/850,810, dated Jun. 7, 2010.
Office Action for U.S. Appl. No. 11/850,810, dated Nov. 9, 2009.
Office Action for U.S. Appl. No. 12/537,778, dated Apr. 5, 2010.
Office Action for U.S. Appl. No. 12/537,778, dated Oct. 21, 2010.
Office Action of the German Patent and Trademark office, German Patent Application No. 10 2006 049 832.1, received Feb. 9, 2015.
Olfati-Saber et al., "Consensus Problems in Networks of Agents with Switching Topology and Time-Delays" IEEE Transactions on Automatic Control, 49(9):1520-1533 (2004).
Rabi et al., "Event-Triggered Strategies for Industrial Control Over Wireless Networks," In Proceedings of 4th Annual International Conference on Wireless Internet (2008).
Search Report for Application No. GB0611940.8, dated Sep. 21, 2006.
Search Report for Application No. GB0620420.0, dated Feb. 12, 2007.
Search Report for Application No. GB0620421.8, dated Feb. 2, 2007.
Search Report for Application No. GB0816097.0, dated Oct. 24, 2008.
Search Report for Application No. GB1300657.2, dated Jun. 13, 2013.
Second Office Action for Chinese Patent Application No. 200610149999.1, dated Sep. 1, 2010.
Second Office Action for Chinese Patent Application No. 200810135579.7, dated Jan. 7, 2013.
Shinskey, F. Greg, "The Power of External-Reset Feedback," *Control*, pp. 53-63 (May 2006).
Shinskey, F.G., "Sampled Integral Controller," *Feedback Controllers for the Process Industry*, p. 93 (1994).
Shinskey, F.G., "Sampling Controllers," *Process Control Systems*, Third Edition, pp. 161-162 ((1988).
Siebert et al., "WirelessHART Successfully Handles Control," Chemical Process, Jan. 2011.
Tatikondaet al., "Control Under Communication Constraints", IEEE Transactions on Automatic Control, 49(7):1056-1068 (2004).
U.S. Appl. No. 11/258,676, filed Oct. 25, 2005.
U.S. Appl. No. 11/499,013, filed Aug. 4, 2006.
U.S. Appl. No. 11/850,810, filed Sep. 6, 2007.
U.S. Appl. No. 13/351,802, filed Jan. 17, 2012.
Vasyutynaskyy et al., "Towards Comparison of Deadband Sampling Types," Proceedings of the IEEE International Symposium on Industrial Electronics, pp. 2899-2904 (2007).
Wei, Yang, "Implementation of IEC61499 Distributed Function Block Architecture for Industrial Measurement and Control Systems (IPMCS)," National University of Singapore, Department of Electrical & Computer Engineering, (2001/2002).
Wong et al., "Systems with Finite Communication Bandwidth Constraints—Part I & II," IEEE Transactions on Automatic Control (1997).
International Preliminary Report on Patentability for Application No. PCT/US2015/021713, dated Sep. 20, 2016.
Examination Report for Application No. GB1300657.2, dated Feb. 23, 2017.
Search Report for Application No. GB1617274.4, dated Mar. 31, 2017.
Combined Search and Examination Report for Application No. GB2020175.2, dated Jan. 22, 2021.
Examination Report for Application No. GB1615542.6, dated Feb. 11, 2020.
Examination Report for Application No. GB1615542.6, dated Oct. 2, 2020.
Examination Report for Application No. GB2020175.2, dated Mar. 23, 2021.
First Office Action for Chinese Application No. 20180015134.3, dated May 15, 2019.
Li et al., "Genetic Programming and Creative Design of Mechatronic Systems," (2009).
Notice of Reasons for Rejection for Japanese Application No. 2016-199737, dated Sep. 15, 2020.
Notice of Reasons for Rejection for Japanese Application No. 2016-557951, dated Feb. 12, 2020.
Notice of Reasons for Rejection for Japanese Application No. 2016-557951, dated Jun. 4, 2019.
Notification of First Office Action for Chinese Application No. 201610890555.7, dated Oct. 29, 2020.
Notification of Second Office Action for Chinese Application No. 201610890555.7, dated May 10, 2021.
Notification of the Second Office Action for Chinese Application No. 201580015134.3, dated Oct. 23, 2019.
Search Report for Chinese Application No. 201580015134.3, dated Nov. 26, 2018.
Examination Report for Application No. GB1617274.4, dated Aug. 4, 2021.
Decision of Refusal for Japanese Application No. 2016-199737, dated Jul. 30, 2021.

* cited by examiner

REDUCING CONTROLLER UPDATES IN A CONTROL LOOP

RELATED APPLICATIONS

This application is a regular-filed application claiming priority to U.S. Provisional Patent Application Ser. No. 61/968,159 entitled "Reducing Controller Updates in a Control Loop," filed Mar. 20, 2014, the entire disclosure of which is hereby expressly incorporated herein by reference. This application is also a continuation-in-part of U.S. patent application Ser. No. 13/351,802 entitled "Compensating for Setpoint Changes in a Non-Periodically Updated Controller," filed Jan. 17, 2012, the entire disclosure of which is hereby expressly incorporated herein by reference. This application is also related to U.S. patent application Ser. No. 11/850,810 entitled "Wireless Communication of Process Measurements," filed Sep. 6, 2007, which is a continuation-in-part of U.S. patent application Ser. No. 11/499,013 entitled "Process Control With Unreliable Communications," filed Aug. 4, 2006 and issued as U.S. Pat. No. 7,620,460, which is a continuation-in-part of U.S. patent application Ser. No. 11/258,676, entitled "Non-periodic Control Communications in Wireless and Other Process Control Systems," filed Oct. 25, 2005 and issued as U.S. Pat. No. 7,587,252, the entire disclosures of each of which are hereby expressly incorporated by reference herein.

TECHNICAL FIELD

This patent relates to implementing control in a control loop having slow, intermittent or non-periodic communications and, more particularly, to a control routine that uses non-periodic signaling within a control loop in a manner that reduces the number of controller updates provided to a controlled device.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the lines or buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV™ system sold by Emerson Process Management, use function blocks or groups of function blocks referred to as modules located in the controller or in different field devices to perform control and/or monitoring operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, monitoring a device, controlling a device, or performing a control operation, such as the implementation of a proportional-integral-derivative (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, one or more control blocks, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a Smith Predictor or Model Predictive Control (MPC).

To support the execution of the control routines, a typical industrial or process plant has a centralized control room communicatively connected with one or more process controllers and process I/O subsystems, which, in turn, are connected to one or more field devices. Traditionally, analog field devices have been connected to the controllers by two-wire or four-wire current loops for both signal transmission and the supply of power. An analog field device, such as a sensor or a transmitter that transmits a signal to the controller modulates the current running through the current loop, such that the current is proportional to the sensed process variable. On the other hand, analog field devices that perform an action under control of the controller are controlled by the magnitude of the current through the loop. Many digital or combined analog and digital field devices receive or transmit control or measurement signals via a digital communication network or a combined analog and digital communication network.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the monitoring applications or control routines typically require periodic updates of the process variables for each iteration of the routine.

Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

A more recent trend has been to use wireless I/O communication networks to alleviate some of the difficulties associated with hardwired I/O networks. For example, U.S. Patent Application Publication No. 2003/0043052, entitled "Apparatus for Providing Redundant Wireless Access to Field Devices in a Distributed Control System," the entire disclosure of which is hereby expressly incorporated by reference herein, discloses a system utilizing wireless communications to augment or supplement the use of hardwired communications.

However, reliance on wireless communications for control-related transmissions has traditionally been limited due to, among other things, reliability concerns. As described above, modern monitoring applications and process control applications rely on reliable data communication between the controller and the field devices to achieve optimum control performance. Moreover, typical controllers execute control algorithms at fast rates to quickly correct unwanted deviations in the process. Undesirable environmental factors or other adverse conditions may create intermittent interferences that impede or prevent the fast or periodic communications necessary to support such execution of monitoring and control algorithms. Fortunately, wireless networks have become much more robust over the last decade, enabling the reliable use of wireless communications in some types of process control systems.

However, power consumption is still a complicating factor when using wireless communications in process control applications. Because wireless field devices are physically disconnected from the I/O network, the field devices typically need to provide their own power source. Accordingly, field devices may be battery powered, draw solar power, or pilfer ambient energy such as vibration, heat, pressure, etc. For these devices, energy consumed for data transmission may constitute a significant portion of total energy consumption. In fact, more power may be consumed during the process of establishing and maintaining a wireless communication connection than during other important operations performed by the field device, such as the steps taken to sense or detect the process variable being measured. To reduce power consumption in wireless process control systems and thus prolong battery life, it has been suggested to implement a wireless process control system in which the field devices, such as sensors, communicate with the controller in a non-periodic manner. In one case, the field devices may communicate with or send process variable measurements to the controller only when a significant change in a process variable has been detected, leading to non-periodic communications with the controller.

One control technique that has been developed to handle non-periodic process variable measurement updates uses a control system that provides and maintains an indication of an expected process response to the control signal produced by the controller between the infrequent, non-periodic measurement updates. An expected process response may be developed by a mathematical model that calculates the expected process response to a control signal for a given measurement update. One example of this technique is described in U.S. Pat. No. 7,587,252, entitled, "Non-Periodic Control Communications in Wireless and Other Process Control Systems," the entire disclosure of which is hereby expressly incorporated by reference herein. In particular, this patent discloses a control system having a filter that generates an indication of an expected process response to a control signal upon the receipt of a non-periodic process variable measurement update, and that maintains the generated indication of the expected process response until the arrival of the next non-periodic process variable measurement update. As another example, U.S. Pat. No. 7,620,460, entitled "Process Control With Unreliable Communications," the entire disclosure of which is hereby expressly incorporated by reference herein, discloses a system that includes a filter that provides an indication of an expected response to the control signal but further modifies the filter to incorporate a measurement of the time that has elapsed since a last non-periodic measurement update to generate a more accurate indication of the expected process response.

However, over the last five years, manufacturers for field instrumentation have introduced a wide variety of WirelessHART® transmitters. Initially these transmitters were only used to monitor the process. However, with the introduction of the techniques described above, it is possible to use wireless measurements in closed loop control applications. Based on the broad acceptance of wireless transmitters, many manufacturers are in the process of developing and introducing wireless on/off and throttling valves.

However, there are a couple of technical challenges that must be addressed to be able to use such wireless valves in closed loop control. In particular, there is typically only a limited amount of power available at the wireless valve, and it is anticipated that much of the available power will be required to make changes in the target valve position, e.g. to drive the valve to its target position in response to the receipt of a control signal. Typical control techniques, however, attempt to send many control signals to the devices being controlled so as to assure robust control performance. However, the high number of controller based moves implemented by these techniques may quickly use up the battery resources at the controlled device. It may be desirable, therefore, to reduce, if possible, the number of valve movements that are made in the course of closed loop control in response to, for example, a change in a setpoint, a process disturbance, etc.

Moreover, in many cases, the control system actions cannot be synchronized with gateway communications that must occur to provide communications between a controller and a wireless valve or other actuator disposed in a wireless communication network. For example, the current design of wireless gateways, e.g., the WirelessHART® gateway, may not immediately act upon a request to communicate a change in valve position to a valve actuator, and thus the valve or actuator may receive a control signal at some significant time after generation of that control signal at the controller. Moreover, the controller may only receive an acknowledgement from the valve or actuator at some still higher significant time after a change in valve position has been sent by the controller. Thus, in this case, the wireless communication of the target valve position (e.g., the control signal) and the valve response introduces a significant variable delay into the control loop, and this delay that impacts PID control, making robust control of the controlled variable more difficult.

SUMMARY

A control technique that may be used in, for example, a PID control loop, significantly reduces the number of communications from the controller (e.g., a PID controller) to a wireless valve or other control element within a process plant, while still providing robust control of a controlled process variable. As such, the wireless valve or other control element may use less power because the valve must react to fewer changes in the target valve position, while still providing acceptable and robust control. Moreover, using this control technique in a plant in which the controller is communicatively connected to a controlled device via a gateway into a wireless network will reduce gateway communications loading, as this technique can result in fewer communications to the wireless valve or other controlled element. This control technique may be used in conjunction with other intermittent or non-periodic control methods, and so may perform control using one or both of a wireless transmitter and a wireless valve (or other wireless control element) in a control loop. Moreover, this technique can be used to perform control in a wired or other periodic control system to reduce unnecessary or ineffective valve movements, such as valve position hunting which is typically experienced in noisy control systems, such as those in which feedback measurements include noise or in which noise results in relatively random process disturbances.

In addition, a new control signal command may be used to send control signals via a wireless or other intermittent, non-periodic or asynchronous communications network so as to aid in the control performance of the control technique described herein. The new controller signal may include both a target value and a time to implement the target value. This command signal or other signal allows an implied valve position to be calculated more accurately at the controller, and thus may be used to perform better or more robust control in a system that experiences significant communication delays in the process control loop communications (e.g., between a process controller and a controlled device such as a valve).

Generally speaking, a control loop implementing the new non-periodic communication technique may include a wireless, slow, non-periodic, or non-synchronized communication connection or path between a controller implementing a control routine (such as a PID control routine) and a controlled device, such as a valve or a valve actuator. The link could be implemented using a wireless or a wired communication infrastructure. In this case, the control technique uses a non-periodic communication block disposed between the controller and the controlled device, wherein the communication block operates to minimize the number of changes made in the target position of the controlled device by reducing the number of control signals that are sent to the controlled device.

More particularly, to minimize the power consumed by the valve actuator, the calculated PID output of the controller may be transmitted to the wireless valve only if specific criteria determined by the non-periodic communication block have been met. As the controller is typically scheduled to execute to produce a control signal much faster than the minimum period at which the target value can be communicated to the wireless controlled device, the application of these criteria will reduce the number of controller signals sent to the controlled device and thereby reduce controller moves implemented by the controlled device. However, the application of the criteria within the communication block still operates to assure that adequate control performance is achieved in the presence of the reduced number of control signals and the communication delays of the control signals to a controlled device. As an example, the non-periodic communication block may operate to communicate a new target position to the controlled device (via the wireless, intermittent, non-synchronized or non-periodic communication path) in the following manner. First, the non-periodic communication block will only send a control signal if the time since the last communication to the wireless controlled device is equal to or greater than the configured period of communication, and a communication of a controlled device acknowledgement to the last change in target position sent to the controlled device has been received. When these conditions are met, then the non-periodic communication block will communicate a new or updated control signal when either or both the absolute value of the difference between the calculated controller output and the last target value communicated to the controlled device exceeds a configured deadband (threshold) value and/or when the time since the last communication to the controlled device exceeds a configured default reporting time.

The target position communicated to the wireless controlled device is normally the calculated output of the controller, such as a PID controller. However, as an option, the magnitude of change in the target position may be limited to the last communicated value plus or minus a maximum change value, when it is determined that the absolute value of the change in the controller output since the last communicated target exceeds the configured maximum change value.

When minimal delay is introduced by communications between a wireless controlled device and a controller, then a feedback signal in the form of a position of a valve, as communicated by the wireless controlled device (e.g., an actuator/valve) to the controller, may be used in the controller positive feedback network to create, for example, a reset contribution of a PID control signal. However, if communications with the wireless controlled device are lost or are not updated in a periodic manner, then the feedback of the last target position of the controlled device (e.g., the target position that a valve actuator is working to achieve) communicated by the wireless valve may be used to determine the reset contribution of the controller operation. To assist the feedback loop of the control system in determining the valve position for use in calculating the reset contribution, the control system (or wireless gateway) may provide a control signal that specifies a control value (e.g., a position to which a valve should move) and a time at which the valve should make such a movement. Such a control signal is useful in situations in which the time it takes for the control signal to reach the controlled device is significant (e.g., caused by a wireless gateway or other slow or non-synchronized communication link). The time specified within the control signal may specify an absolute time or an offset time from, for example, the timestamp of the control signal. If the offset time is configured to be greater than the time that it takes the control signal to reach the controlled device from the controller, then the controlled device will receive the control signal and implement the change at the specified time. In this case, the controller can assume that the control signal was received and implemented by the controlled device at the specified time and so can update the valve position in the feedback loop of the controller at that time, without needing to receive a feedback signal from the controlled device indicting that the controller move was implemented. This operation may result in better control performance in a PID controller.

DETAILED DESCRIPTION

Figure 1:
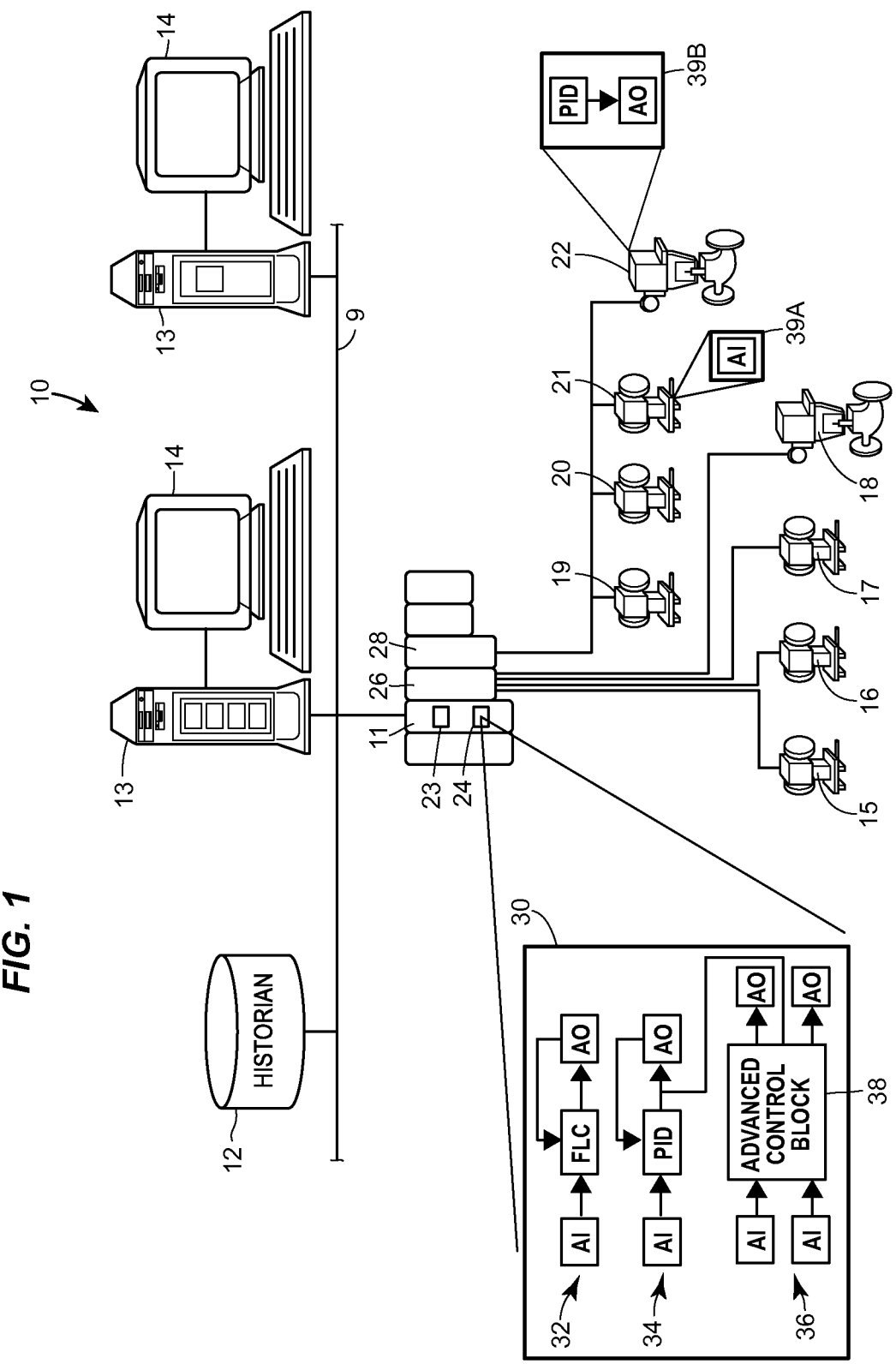
FIG. 1 is a block diagram of a typical, periodically updated, hard-wired process control system.

A control technique enables a controller to communicate or send control signals to a controlled device of a process, such as a valve actuator, in a non-periodic, wireless, slow, significantly delayed or otherwise non-synchronous manner, to reduce the number of actuator moves effectuated by the actuator while still providing robust control performance. As such, the control technique implements a control methodology that drives an actuator or other controlled device in a manner that reduces the power consumption of the controlled device, reduces frequent changes of the controlled device that result in a "hunting" phenomena that frequently occurs in control loops that experience significant noise or process disturbances, and reduces communication loading in communication devices within a wireless network that is used to implement a control loop, such as in wireless gateway devices.

In particular, a control communications block within a control loop operates to send newly created control signals generated by a controller in a non-periodic manner, based on a number of configuration factors, such as a communication deadband, a control signal change threshold, and a communication period. Moreover, to accommodate the control of a device in the presence of a delayed control signal, a continuously updated filter within the controller generates an indication of an expected process response (also called a feedback contribution) during each control routine iteration of the controller based on an actual or an implied position of the controlled device. This feedback contribution is used in the controller to assure proper control in the presence of significant delay between the controller generating a control signal and the controlled device receiving and acting upon the control signal. In some cases, the continuously updated filter may use, in part, a previously generated indication of an expected response from the last control routine iteration and the control routine execution period to generate the indication of an expected response during each control routine iteration.

In addition, when process measurement feedback signals are provided to the controller in an intermittent, non-periodic or a delayed manner, a current output of the continuously updated filter may be used as a feedback contribution, such as an integral (also known as reset) and/or a derivative (also known as rate) contribution within the controller, only when a new measurement indication is received. Generally speaking, in this case, an integral output switch maintains the expected process response that was generated by the continuously updated filter at the time that the last measurement value update was received by the controller as the integral or reset contribution to the control signal. When a new measurement value update is available, the integral output switch clamps onto a new indication of the expected process response generated by the continuously updated filter (based on an indication of the new measurement value update), and provides the new expected process response as the integral or rate contribution of the control signal. As a result, the controller uses the continuously updated filter to determine a new expected response of the process during each controller iteration, wherein each new expected process response reflects the impact of changes that were made in the time between measurement updates and so affects the controller output during development of the control signal, even though the integral or reset component of control signal produced by the controller is changed only when a new feedback value is available at the controller.

A process control system 10 illustrated in FIG. 1, that may be used to implement the control methodology described herein, includes a process controller 11 connected via a communication line or bus 9 to a data historian 12 and to one or more host workstations or computers 13 (which may be any type of personal computers, workstations, etc.), each having a display screen 14. The communication network 9 may be, for example, a Ethernet network, a WiFi network or any other wired or wireless network. The controller 11 is also connected to field devices 15-22 via input/output (I/O) cards 26 and 28 and is illustrated as being communicatively connected to the field devices 15-22 using one or more hardwired communication networks and communication schemes. The data historian 12 may be any desired type of data collection unit having any desired type of memory and any desired or known software, hardware or firmware for storing data.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the devices 15-22, the host computers 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as an actuator or a valve, to perform some physical function within the process control system 10. Of course, hybrid and other types of function blocks exist and may be utilized herein. The function blocks may be stored in and executed by the controller 11 or other devices as described below.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters or sensors, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the stand-alone controller 11 or, alternatively, can be located in and executed by any other processing device or control element of the process control system, such as one of the workstations 13 or one of the field devices 19-22. As an example, the field devices 21 and 22, which may be a transmitter and a valve, respectively, may execute control elements for implementing a control routine and, as such, may include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID or other control block in communication with an analog output (AO) block, as illustrated in FIG. 1.

Figure 2:
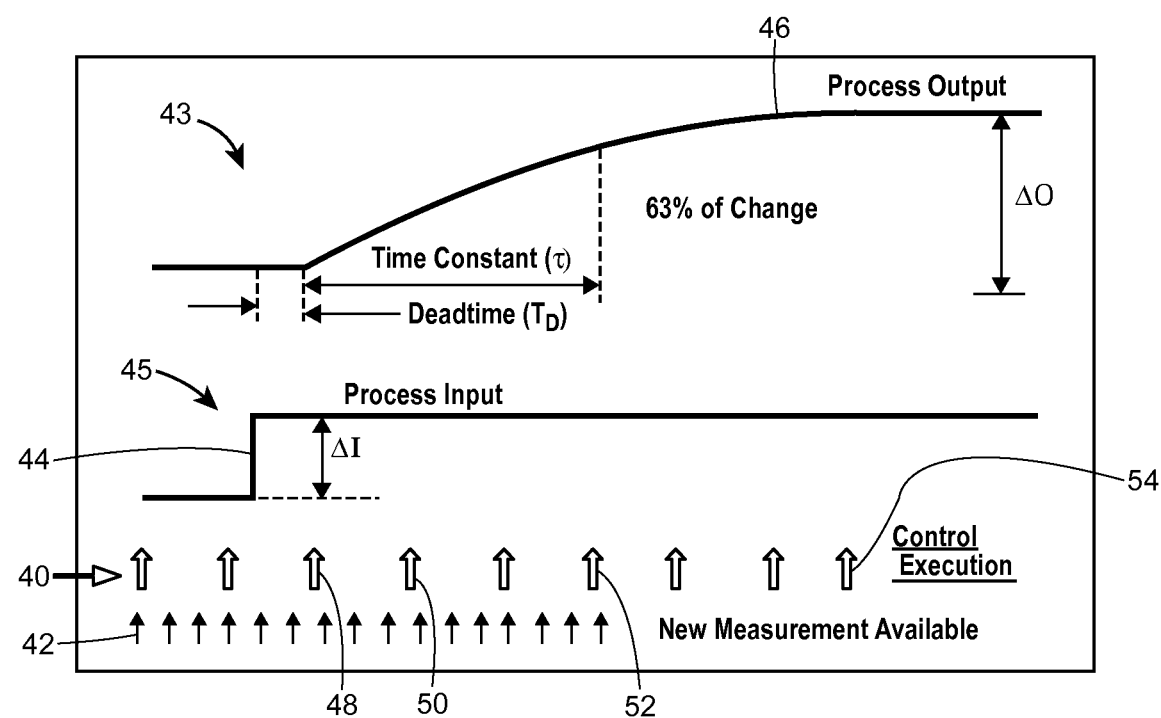
FIG. 2 is graph illustrating a process output response to a process input for an example periodically updated, hard-wired process control system.

The graph of FIG. 2 generally illustrates a process output developed in response to a process input for a process control system based on the implementation of one or more of the control loops 32, 34 and 36 (and/or any control loop incorporating the function blocks residing in the field devices 21 and 22 or other devices). The control routine being implemented generally executes in a periodic manner over a number of controller iterations with the times of the control routine execution being indicated in FIG. 2 along the time axis by the thick arrows 40, 48, 50, 52, and 54. In a conventional case, each control routine iteration 40 is supported by an updated process measurement indicated by the thin arrows 42 provided by, for instance, a transmitter or other field device. As illustrated in FIG. 2, there are typically multiple periodic process measurements 42 made and received by the control routine between each of the periodic control routine execution times 40. To avoid the restrictions associated with synchronizing the measurement value with control execution, many known process control systems (or control loops) are designed to over-sample the process variable measurement by a factor of 2-10 times. Such over-sampling helps to ensure that the process variable measurement is current for use in the control scheme during each control routine execution or iteration. Also, to minimize control variation, conventional designs specify that feedback based control should be executed 4-10 times faster than the process response time. Still further, in conventional designs, to assure best control performance, the control signal developed at the output of the controller during each controller execution period is sent to the controlled device to be acted upon or to effect the controlled device operation. The process response time is depicted in a process output response curve 46 of the graph 43 of FIG. 2 as being the time associated with a process time constant (i) (e.g., 63% of the process variable change) plus a process delay or deadtime ($T_D$) after an implementation of a step change 44 in a process input (shown in the lower line 45 of FIG. 2). In any event, to satisfy these conventional design requirements, the process measurement value updates (indicated by the arrows 42 of FIG. 2) have been sampled and provided to the controller at a much faster rate than the control routine execution rate (indicated by the arrows 40, 48, 50, 52, and 54 of FIG. 2), which in turn is much faster or higher than the process response time.

However, in some control system configurations, such as in ones in which a controller sends control signals or receives process variable measurements wirelessly from one or more field devices, it may not be possible to send a control signal to the controlled device in a manner that assures that each output of the controller will reach the controlled device in a synchronous manner or with only minimal time delay between the sending of the control signal and the receipt of that signal at the controlled device. Moreover, obtaining frequent and periodic measurement samples from the process in these types of systems may not be practical or even possible. In particular, in these cases, the controller may only be able to receive non-periodic process variable measurements, and/or the time between the non-periodic or even periodic process variable measurements may be greater than the control routine execution rate (indicated by the arrows 40 of FIG. 2).

Figure 3:
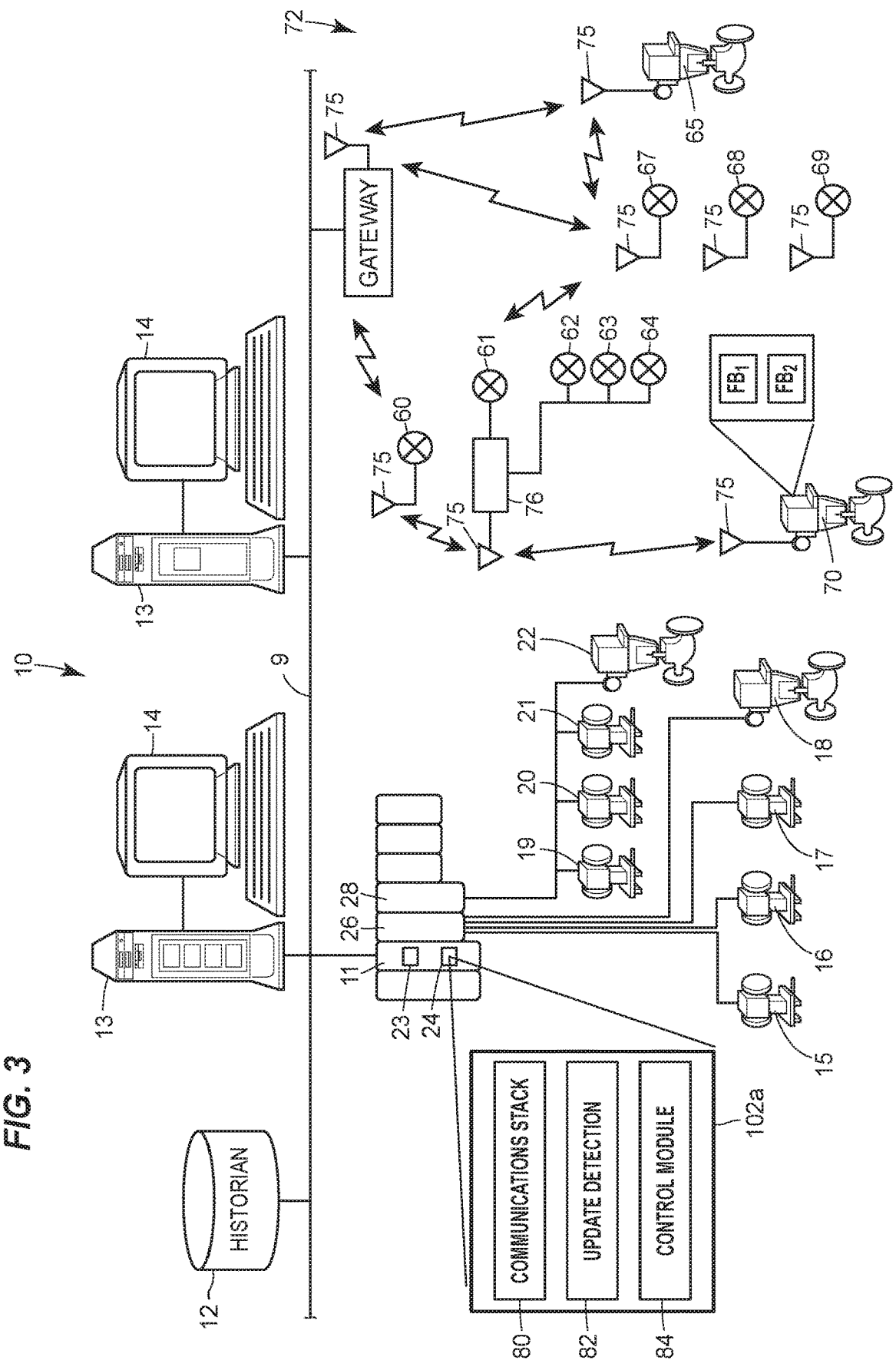
FIG. 3 is a block diagram illustrating an example of a process control system having a controller that transmits control signals to a controlled device in a non-periodic or wireless manner via a wireless gateway device, and/or that receives non-periodic, non-synchronized or significantly delayed feedback signals via a wireless network.

FIG. 3 depicts an exemplary partially wireless process control system 10 that may exhibit the problems discussed above, and which thus may not be able to perform acceptable or desired control using the typical control techniques described with respect to FIG. 2. However, a new control technique described herein with respect to FIGS. 4-10 may be implemented in the plant configuration of FIG. 3 to perform control in a manner that minimizes the control movements of controlled devices while performing control in the presence of non-periodic, wireless and/or significantly delayed communications of process control signals between a controller and a controlled device and/or of process variable measurements between sensors or transmitters and a controller. In particular, the control system 10 of FIG. 3 is similar in nature to the control system 10 of FIG. 1, with like elements being numbered the same. However, the control system 10 of FIG. 3 includes a number of field devices 60-70 which are wirelessly communicatively coupled to one another within a wireless network 72, such as a WirelessHART® communication network, and which are coupled to the controller 11 via a gateway device 73. As illustrated in FIG. 3, the wirelessly connected field devices within the network 72 are connected to or include antennas 75 that cooperate with each other and with an antenna 76 (which is coupled to the gateway device 73) to communicate wirelessly within the network 72. In one case, some of the field devices, illustrated as the devices 61-64, are connected via hardwired lines to a wireless gateway or conversion device 76, which performs communication within the wireless network 72 for those devices. Of course, others of the devices in the wireless network 72 may be wireless devices and may each have their own wireless communication modules for performing wireless communications within the network 72. Moreover, the field devices 60-70 may be any types of field devices including, for example, transmitters, actuators (such as valve actuators), valves, etc.

As will be understood, each of the transmitters 60-64 and 66-69 of FIG. 3 may transmit a signal indicative of a respective process variable (e.g., a flow, a pressure, a temperature or a level signal) to the controller 11 via the wireless communication network 72, the gateway device 73, and the network 9 for use in one or more control loops or routines implemented in the controller 11. Other wireless devices, referred to as controlled devices, such as the valves or valve actuators 65 and 70 illustrated in FIG. 3, may receive process control signals from the controller 11 wirelessly or partially wirelessly (e.g., via the network 9, the gateway 73 and the wireless network 72). Moreover, these devices may be configured to transmit other signals (e.g., signals indicative of any other process parameter such as the current position or state of the device, acknowledgement signals, etc.) to the controller 11 and or other devices in the plant 10 via the wireless network 72. Generally speaking, as illustrated in FIG. 3, the controller 11 includes a communications stack 80 that executes on a processor 23 to process the incoming signals, a module or a routine 82 that executes on the processor 23 to detect when an incoming signal includes a measurement update or to detect other signals from the devices within or associated with a control loop, and one or more control modules 84 which execute on the processor 23 to perform control based on the measurement updates. The detection routine 82 may generate a flag or other signal to denote that data being provided via the communications stack 80 includes a new process variable measurement or other type of update. The new data and the update flag may then be provided to one or more of the control modules 84 (which may be function blocks) which are then executed by the controller 11 at a predetermined periodic execution rate, as described in further detail below. Alternatively, or in addition, the new data and the update flags may be provided to one or more monitoring modules or applications executed in the controller 11 or elsewhere in the control system 10.

Thus, as described above, the process control system 10 of FIG. 3 generally uses the wireless transmission of control signals and of data measured, sensed by or computed by the transmitters 60-64 and 66-69 or other control elements, such as the field devices 65 and 70, to perform control. As an example, in the control system 10 of FIG. 3, new control signals from the controller 11 to a controlled device, such as one of the valves 65 or 70, are transmitted to that device via the gateway device 73 and the wireless network 72. Moreover, in some cases, the new process variable measurements or other signal values used in the feedback calculations of the controller 11 may be transmitted to the controller 11 via the wireless network 72 by the devices 60-64 and 66-69 on a non-periodic, intermittent or slow basis, such as only when certain conditions are satisfied. For example, a new process variable measurement value may be sent to the controller 11 when the process variable value changes by a predetermined amount with respect to the last process variable measurement value sent by the device to the controller 11. Of course, other manners of determining when to send process variable measurement values in a non-periodic manner may be implemented as well or instead.

In any event, the presence of the wireless communication network 72 and/or the use of the gateway device 73 within the communication path between the controller 11 (which performs control calculations) and the controlled device (e.g., a valve or actuator device) which receives control signals, and between the sensors (which measure controlled process variables) and the controller 11 (which uses the sensor signals in a feedback loop of the control calculations) may make the communications in the control loop asynchronous, non-periodic and/or experience significant delays during communications. For example, typical wireless gateways into a WirelessHART® network may delay control communications by 3-6 seconds, making for high speed synchronous control difficult when using these networks. Such delays may also occur when transmitting signals from a sensor or transmitter device within a wireless communications network to a controller outside of that network.

Thus, the existence of the wireless communications between the controller 11 and the devices within the wireless network 72 of FIG. 3 generally results in asynchronous, significantly delayed and/or non-periodic communications, which in turn produces irregular or otherwise less frequent data transmissions between the controller 11 and the field devices 60-64 and 66-69 and/or vice-versa. As noted above, however, the communication of a control signal to and the communication of measurement values from the wired field devices 15-22 has traditionally been structured to be performed in a periodic manner to, in turn, support the periodic execution of the control routine(s) within the controller 11. As a result, typical control routines in the controller 11 are generally designed for periodic updates of the process variable measurement values used in the feedback loops of the controller 11.

To accommodate for non-periodic or otherwise significantly delayed control and measurement signals within a control loop introduced by, for example, wireless communication hardware disposed between the controller 11 and at least some of the field devices, the control and monitoring routine(s) of the controller 11 may be restructured or modified as described below to enable the process control system 10 to function properly when using non-periodic or other intermittent or significantly delayed communication signals, and especially when these signal transmissions occur less frequently than the execution rate (e.g., the periodic execution rate) of the controller 11.

Figure 4:
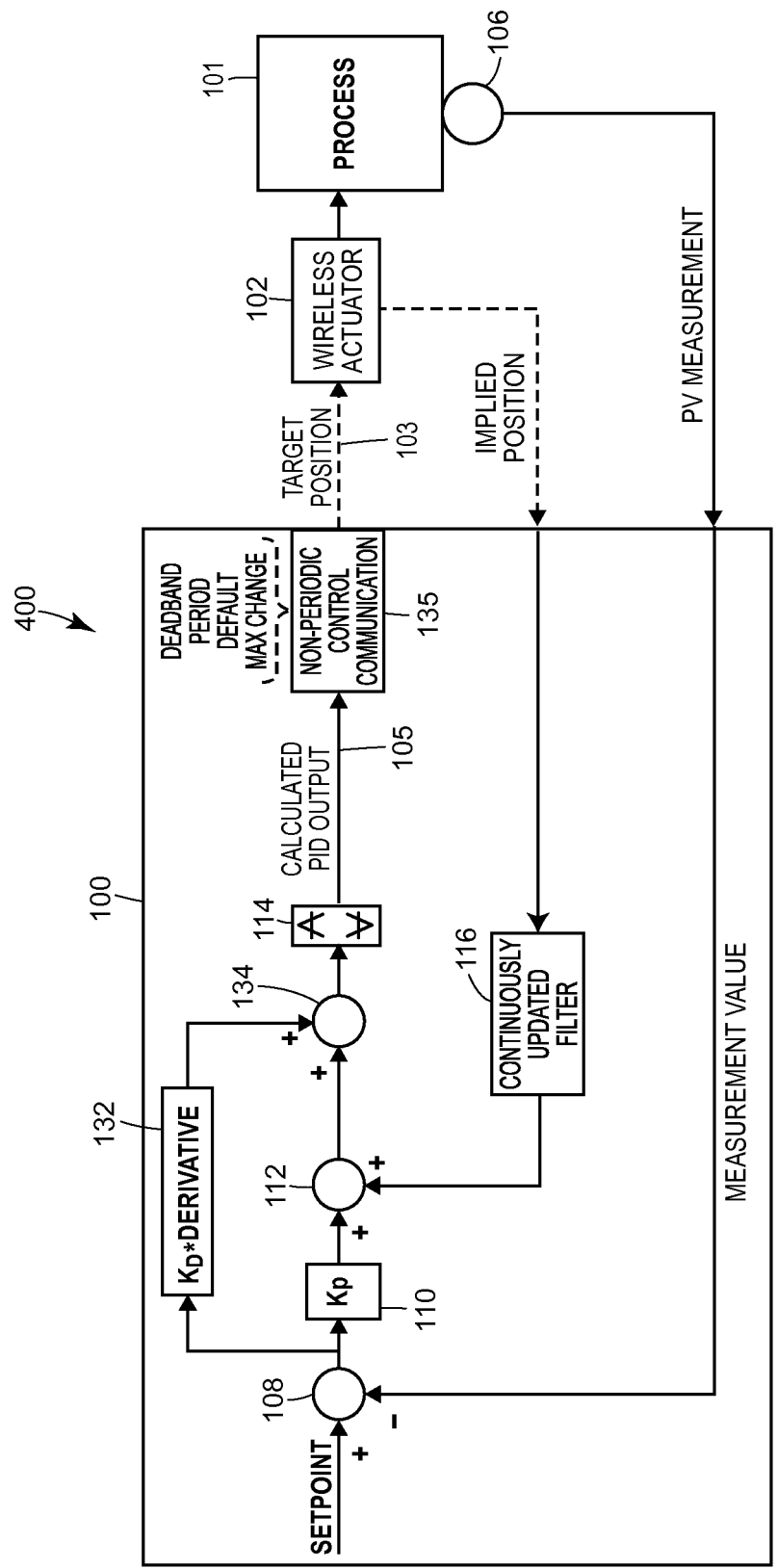
FIG. 4 is a block diagram of an example controller that performs control using a non-periodic control signal communications module disposed between a controller and a controlled device, and in which communications between the controller and the controlled device occur over a wireless communication network, wherein the communications module operates to reduce the number of controller signals sent to the controlled device.

An exemplary control scheme or control system 400 configured to operate using non-periodic control-related communications is illustrated in more detail in FIG. 4, which schematically illustrates a process controller 100 coupled to control a process 101. More particularly the controller 100 is coupled to a wireless actuator 102 of the process 101 via a wireless communication link 103 (illustrated with a dashed line in FIG. 4). In this case, the actuator 102 is a controlled device and may be an actuator for a valve, for example, which controls fluid flow within the process 101. The control scheme implemented by the controller 100 (which may be the controller 11 of FIGS. 1 and 3 or a control element of a field device, e.g., one of the wireless field devices of FIG. 3, etc.) generally includes the functionality of the communications stack 80, the update detection module 82 and one or more of the control modules 84 illustrated and described in connection with FIG. 3 (item 102a).

In the exemplary system of FIG. 4, the controller 100 receives a setpoint signal from, for example, one of the workstations 13 (FIGS. 1 and 3) or from any other source within or in communication with the process control system 10, and operates to generate one or more control signals 105 (or controller moves) which are provided from an output of the controller 100 to the wireless actuator 102 via the wireless communication link 103. Besides receiving the control signal 105, the process 101 (or the actuator 102 which may be within the process 101) may be subjected to measured or unmeasured disturbances. Depending on the type of process control application, the setpoint signal may be changed at any time during control of the process 101, such as by a user, a tuning routine, etc. Of course, the process control signals may control an actuator associated with a valve or any other type of movable control element, or may control any other field device to cause a change in the operation of the process 101. The response of the process 101 to changes in the process control signals 105 is measured or sensed by a transmitter, sensor or other field device 106, which may, for example, correspond to any one of the transmitters 60-64 or 66-69 illustrated in FIG. 3. The communication link between the transmitter 106 and the controller 100 is illustrated in FIG. 4 as being a hardwired communication link that provides synchronous, periodic or immediate feedback signals to the controller 100, but may be any other type of communication link that provides feedback signals with little or no delay.

In a simple embodiment, the controller 100 may implement a single/input, single/output closed-loop control routine, such as a PID control routine, which is one form of a PID type of control routine. As used herein, a PID type of control routine includes any of a proportional (P), integral (I), derivative (D), proportional-integral (PI), proportional-derivative (PD), integral-derivative (ID), or proportional-integral-derivative (PID) control routine. Accordingly, the controller 100 includes several standard PID controller elements, including a control signal generation unit having a summing block 108, which produces an error signal between a setpoint and a measured process variable, a proportional gain element 110, a further summing block 112 and a high-low limiter 114. The control routine 100 also includes a direct feedback path including a filter 116. The filter 116 in this case may be coupled to the output of the high-low limiter 114 or, as illustrated in FIG. 4, may be coupled to the actuator 102, to receive an implied actuator position signal to use in calculating the reset (or other) control component of the control signal produced by process controller 100. Generally speaking, the output of the filter 116 is connected to the summer 112 which adds the reset (integral) component produced by the filter 116 to the proportional component produced by the gain unit 110. Additionally, as illustrated in FIG. 4, the controller 100 may include a derivative component calculation block 132 that receives the error signal from the summing block 108 in parallel with the elements dedicated to the calculation of the proportional and integral contributions. Here, a summer 134 adds the derivative component of the control signal to the output of the summer 112 to produce the PID control signal with proportional, derivative and integral components. Of course, the summers 112 and 134 could be combined into a single unit if desired. Moreover, while other PID configurations may be utilized (e.g., a serial configuration), the proportional, integral and derivative contributions are illustrated as being combined at the summing blocks 112 and 134 to produce a non-limited control signal.

More specifically, during operation of the controller 100, the summing block 108 compares the setpoint signal with the most recently received process variable measurement value provided from the transmitter 106 to produce an error signal. The proportional gain element 110 operates on the error signal by, for example, multiplying the error signal by a proportional gain value $K_p$ to produce a proportional contribution or component of the control signal. The summing block 112 then combines the output of the gain element 110 (i.e., the proportional contribution) with the integral or reset contribution or component of the control signal produced by a feedback path and, in particular by the filter 116. The summer 134 adds the derivative component produced by the block 132 to produce a non-limited control signal. The limiter block 114 then performs high-low limiting on the output of the summer 134 to produce the control signal 105 to be used to control the process 101 and, in particular, the actuator 102.

Moreover, as illustrated in FIG. 4, the filter 116 is coupled to receive an implied position from the actuator 102 via a wireless communication link (which may be the same link as the link 103 used to communicate the control signal to the actuator 102). The filter 106 uses this implied position value to determine the reset (integral) component of the control signal 105 in a manner discussed in more detail below. Generally speaking, when minimal delay is introduced by communications between the controller 100 and the wireless valve or actuator 102, then a valve position feedback that is communicated back to the controller 100 by the wireless actuator/valve 102 (i.e., the implied position value) may be used in the positive feedback network (i.e., in the filter 116) to create the reset contribution of the PID controller 100. Here, if communications with the wireless valve 102 are lost or are not updated in a periodic manner, then the feedback of the last target valve position (i.e., the target position to which the valve actuator 102 was last known to be working to achieve) communicated by the wireless valve or actuator 102 is used as the implied position that is input to the continuously updated filter 116.

Importantly, as illustrated in FIG. 4, the control routine implemented by the controller 100 also includes a control communication block 135 which may be used to minimize the number of changes made in the target position used by or provided to the actuator 102 when control is implemented using a wireless valve or some other communication network that causes a significant delay in the transmission of a control signal to the controlled device. In particular, to minimize the number of control signals sent to the actuator 102 and thereby minimize the power consumed by the valve actuator 102, the block 135 only transmits calculated controller outputs or control signals 105 (as produced by the control routine in a periodic manner) to the wireless actuator 102 when particular criteria have been met. In a general sense, the use of these criteria reduces or minimizes the number of control signal changes that are sent to the actuator 102 while still performing robust control of the process.

Generally speaking, the PID controller 100 is typically scheduled to execute at a rate that is much faster than the maximum rate at which the target value of the actuator 102 is communicated to the wireless actuator 102 using the block 135. More particularly, the block 135 will only send a new value of the control signal 105 to the actuator 102 if the time since the last communication that was sent to the wireless actuator 102 is equal to or greater than a configured period of communication and the communication of the actuator acknowledgement to the last change in target position has been received at the block 135. If desired, the configured period of communication may be less than or equal to the execution rate of the communications block 135 which implements communications with the controlled device, so that operation or execution of the communications block 135 is a tacit determination that the configured communications period has passed (i.e., that the elapsed time since sending a previous control signal to the controlled device is greater than a minimum time threshold). In any event, if these conditions are met, then the block 135 will transmit a new target position (i.e., a new or updated control signal 105) to the actuator 102 when either or both of two additional signaling criteria are met. In particular, if the absolute value of the difference between the newly calculated control signal and the last control signal communicated to the actuator 102 exceeds a configured deadband value (i.e., a threshold) and/or if the time since the last communication to the actuator 102 exceeds a configured default reporting time, then the control communication block 135 will communicate the newly calculated control signal 105 to the actuator 102. If these conditions are not met, then the control communication block 135 will not send the newly calculated control signal 105 to the actuator 102.

Thus, generally speaking, the routine implemented by the control communications block 135 will only send a control signal at most, once per a configured communication period (which will typically be set to be greater than or equal to the controller execution period) and only when the controller has received an acknowledgement that the last control signal sent to the actuator has been in fact received by the actuator. This initial set of conditions assures that the controller sends control signals no greater than a particular rate and does not send a new control signal when the pervious control signal may not have been received by the actuator (as determined by the actuator acknowledgement of the previously sent control signal). Moreover, if these conditions are met (i.e., the time since the last control signal has been sent to the actuator 102 is greater than a configured or preset time and the actuator 102 has acknowledged receipt of the last control signal), then a new control signal is sent only if the magnitude of the new control signal differs from the magnitude of the previously sent control signal by a predetermined threshold and/or if the time since the last communication to the actuator 102 exceeds a configured default reporting time.

The communications block 135 thus assures that new control signals are sent to the actuator 102 only when the previous control signal has been verified to have been received at the actuator 102 and a particular minimum amount of time has passed since the last control signal has been sent (as determined by the configured period of communication), and only if either the magnitude of the new control signal to be sent and the magnitude of the most recently received control signal differs by a threshold amount or if the time since the sending of the last sent control signal and the current time exceeds a particular threshold value (even if the difference in magnitudes of the control signals does not equal or exceed the threshold value.) This operation generally reduces the number of control signals being sent to the actuator 102, so as to reduce the number of actuator moves required by the controller, but does so in a manner that enables robust control within the process.

Moreover, if desired, the valve target position communicated to the wireless actuator 102 by the block 135 as part of the control signal may normally be the calculated output of the control routine (i.e., the value of the most recent control signal 105). However, as an option, the magnitude of change in the target position (i.e., the magnitude of the change in the control signal between successive control signal communications sent to the actuator 102) may be limited to the last communicated control or target value plus or minus a maximum change value. Thus, when the absolute value of the change in the control signal between a new control signal and the last communicated control signal exceeds the configured maximum change value, the newly sent control signal (or target value) will be limited to a signal value having this maximum change. In this manner, the control communication block 135 may limit the amount of change in the control signal between successive control signal communications to the actuator 102. Such a limiting action may be desirable when the feedback or acknowledgement of the last communicated control signal experiences a significant delay, to prevent large jumps in the control signals, which may lead to poorer control performance.

As an advantage of this communication method, when the feedback or acknowledgement of the last communicated control value or target position provided by the wireless actuator 102 to the controller 100 (i.e., the implied actuator position) is communicated with minimal delay, then this value may be used in the positive feedback network (e.g., by the filter 116) to calculate the PID reset component. This operation automatically compensates for any delay or variation introduced by communications to the wireless actuator 102, and so no changes in PID tuning are required to compensate for the delays in communicating the target position to the valve. As a result, the PID controller tuning is established strictly by the process gain and dynamics, independently of delays introduced by communications.

More particularly, using the control communication routine described above still enables the filter 116 to operate to produce the integral or reset contribution component of the control signal in manner that provides for robust control of the process while simultaneously reducing communications between the controller 100 and the actuator 102. In particular, the filter 116, which is coupled to receive an implied actuator position (as sent from the actuator 102 via, for example, a wireless communication path), produces an indication of the expected process response to the control signal 105 based on the implied actuator position and the execution period or time of the control algorithm 100. In this case, the implied actuator position may be the most recent control signal (or the target position of the most recent control signal) received at the actuator 102, wherein the control signal indicates the position to which the actuator 102 is to move. Upon execution, as illustrated in FIG. 4, the filter 116 provides the expected process response signal to the summer 112. If desired, the expected process response to changes in the output of the summer 108, as produced by the filter 116, may be approximated using a first order model as described in more detail below. More generally, however, the expected process response may be produced using any appropriate model of the process 101, and is not limited to a process model associated with determining an integral or reset contribution for a control signal. For example, controllers utilizing a process model to provide the expected process response may or may not incorporate a derivative contribution such that the control routine 100 may implement a PID or a PI control scheme.

Prior to discussing the operation of the filter 116 of FIG. 4 in more detail, it is useful to note that a traditional PI controller may be implemented using a positive feedback network to determine the integral or reset contribution. Mathematically, it can be shown that the transfer function for a traditional PI implementation is equivalent to the standard formulation for unconstrained control, i.e., where the output is not limited. In particular:

$$\frac{O(s)}{E(s)} = K_P\left(1 + \frac{1}{sT_{Reset}}\right)$$

where $K_p$=Proportional Gain
$T_{Reset}$=Reset, seconds
$O(s)$=Control Output
$E(s)$=Control Error One advantage of using the positive feedback path from the actuator 102 to provide an implied actuator position, as illustrated in FIG. 4, is that the reset contribution is automatically prevented from winding up when the controller output is high or low limited, i.e., by the limiter 114.

In any event, the control technique described herein enables using a positive feedback path for determining the reset contribution when the controller receives periodic or non-periodic updates of the process variable, while still enabling a robust controller response in the event of setpoint changes or feed-forward changes that occur between the receipt of new process variable measurements, and while also limiting the number of actuator moves during operation of the process control loop. Specifically, to provide robust setpoint change operation, the filter 116 is configured to calculate a new indication or value of an expected process response during each or every execution of the controller 100. As a result, the output of the filter 116 is regenerated anew during each execution cycle of the controller routine, even though the input to the filter 116 (the implied position of the actuator 102) may not be updated on such a periodic basis.

Generally, the new indication of the expected process response, as produced by the filter 116, is calculated during each controller execution cycle from the implied actuator position, the indication of an expected response produced by the filter 116 produced during the last (i.e., immediately preceding) controller execution cycle, and the controller execution period. As a result, the filter 116 is described herein as being continuously updated because it is executed to produce a new process response estimation during each controller execution cycle. An example equation that may be implemented by the continuously updated filter 116 to produce a new expected process response or filter during each controller execution cycle is set forth below:

$$F_N = F_{N-1} + (O_{N-1} - F_{N-1}) * \left(1 - e^{\frac{-\Delta T}{T_{Reset}}}\right)$$

where $F_N$=New filter output
$F_{N-1}$=Filter output last execution
$O_{N-1}$=Implied actuator position (e.g., last control signal received by the actuator)
$\Delta T$=Controller execution period Here, it will be noted that the new filter output $F_N$ is iteratively determined as the most previous filter output $F_{N-1}$ (i.e., the current filter output value) plus a decaying component determined as the difference between the most recent controller output value (or target position) received at the actuator $O_{N-1}$ (the implied actuator value) and the current filter output value $F_{N-1}$ multiplied by a factor dependent on the reset time $T_{Reset}$ and the controller execution period $\Delta T$.

Using a filter that updates continuously in this manner, the control routine 100 is better able to determine the expected process response when calculating the integral control signal component whenever a new process variable measurement is received, thereby being more reactive to a changes in the setpoint or other feed-forward disturbances that occur between the receipt of two process variable measurements. More particularly, it will be noted that a change in the setpoint (without the receipt of a new process measurement value) will immediately result in a change in the error signal at the output of the summer 108 which changes the proportional contribution component of the control signal and thus changes the control signal. As a result, the filter 116 will immediately begin producing a new expected response of the process to the changed control signal and may thus update its output prior to the controller 100 receiving a new process measurement value measured in response to that change. Then, when the controller 100 receives a new process measurement value, and a sample of the filter output is clamped to the input of the summer 112 to be used as the integral or reset contribution component of the control signal, the filter 116 has iterated to an expected process response that, to some degree at least, has reacted to or has incorporated the response of the process 101 to the change in the setpoint.

Thus, as will be understood, the control technique illustrated in FIG. 4 calculates an indication of an expected process response via the continuously updated filter 116 (e.g. the reset contribution filter) for each execution of the control block or routine 100. In the embodiment of FIG. 4, the controller 100 configures the continuously updated filter 116 to calculate a new indication of an expected response for each execution of the control block. Thus, the continuously updated filter 116 continues to calculate an indication of an expected response for each iteration of the control routine based on the implied actuator position (e.g., the control signal most currently received at the actuator 102) and this new indication of an expected response is delivered to the summing block 112 during each execution cycle.

This control technique allows the continuously updated filter 116 to continue to model the expected process response regardless of whether a new measurement value is communicated and without needing to determine whether the current controller output will be sent to the actuator 102. If the control output changes as a result of a setpoint change or a feed-forward action based on a measured disturbance, the continuously updated filter 116 correctly reflects the expected process response by calculating a new indication of an expected response at each control routine iteration based on the implied position of the actuator 102.

It should be noted that the simple PID controller configuration of FIG. 4 uses the output of the filter 116 directly as the reset contribution to the control signal, and, in this case, the reset contribution of a closed-loop control routine (e.g. the continuously updated filter equation presented above) may provide an accurate representation of the process response in determining whether the process exhibits steady-state behavior. However, other processes, such as deadtime dominant processes, may require the incorporation of additional components in the controller of FIG. 4 in order to model the expected process response. With regard to processes that are well represented by a first-order model, the process time constant may generally be used to determine the reset time for the PI (or PID) controller. More specifically, if the reset time is set equal to the process time constant, the reset contribution generally cancels out the proportional contribution such that, over time, the control routine 100 reflects the expected process response. In the example illustrated in FIG. 4, the reset contribution may be effected by a positive feedback network having the filter 116 with the same time constant as the process time constant. While other models may be utilized, the positive feedback network, filter, or model provides a convenient mechanism for determining the expected response of a process having a known or approximated process time constant.

Figure 5:
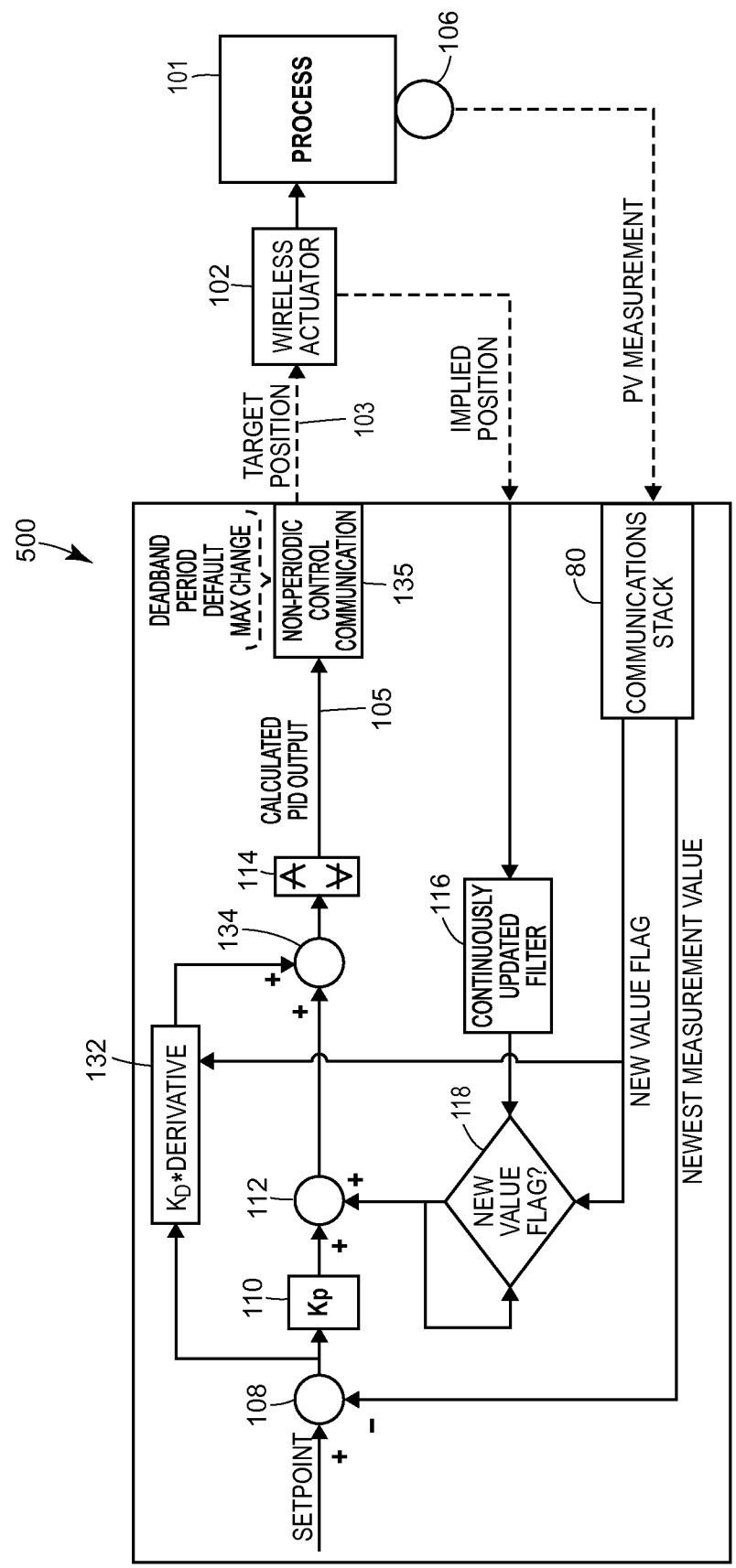
FIG. 5 is a block diagram of a process control system that implements a non-periodic control communication technique to reduce the number of control signals sent to a controlled device via a wireless or other intermittent, slow or non-synchronous communication network and that also receives feedback signals via a wireless, slow, or intermittent communication path.
Figure 6:
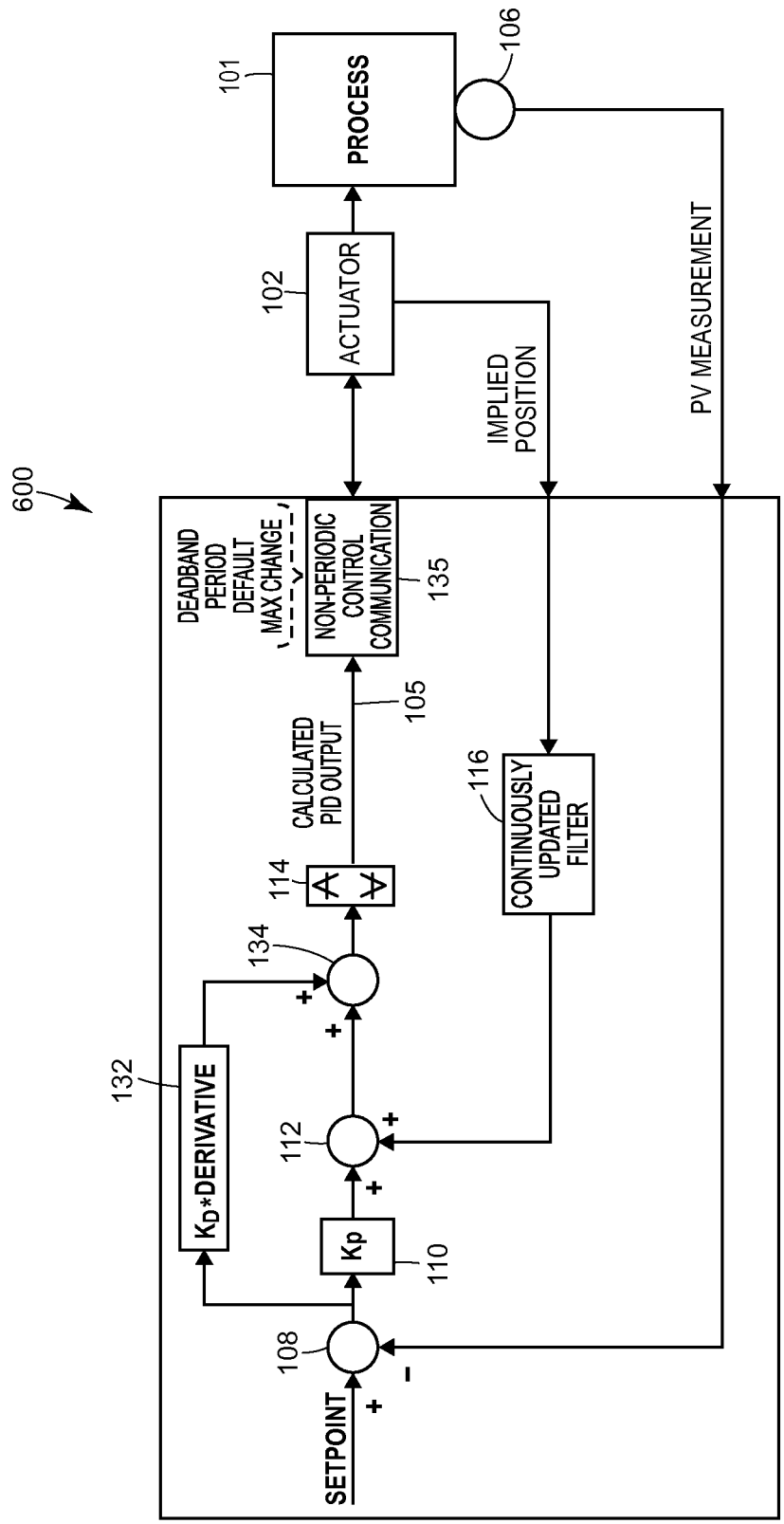
FIG. 6 is block diagram of a process control system that implements a non-periodic control communication technique that reduces the number of control signals sent to a controlled device in a communication network that uses wired or synchronous communications.

FIGS. 5 and 6 illustrate some other examples of control systems that may use the communication control and filtering technique described above with respect to FIG. 4 to provide for robust control in response to setpoint changes while also minimizing controller moves in a controlled device. In particular, in some applications, various different combinations of wired or wireless transmitters or sensors and wired or wireless controlled devices, such as valves, may be used in the control scheme. More particularly, it may be desirable to implement the control technique described above to minimize controller moves in a control loop that includes a wireless transmitter and a wired valve or actuator, in a control loop that includes a wired transmitter and a wireless valve or actuator (such as illustrated in FIG. 4), in a control loop that includes a wireless transmitter and a wireless valve or actuator, and/or in a control loop that includes a wired transmitter and a wired valve or actuator. Here, it will be understood the wireless communication paths in the examples described herein are presumed to introduce slow, intermittent, non-synchronous, non-periodic and/or significantly delayed transmissions between the controller and the actuator and/or between the transmitter (sensor) and the controller, and that the same concepts or control techniques described herein for these networks could be applied to control systems that have any communication network that has one or more of these properties, even if these communication networks or control systems are not wireless in nature.

FIG. 5 illustrates an example control system 500 or control loop that includes both a wireless transmitter (and so a wireless feedback communication path) and a wireless valve or actuator (and so a wireless control signal communication path). It will be assumed that significant delays, lost signals, non-periodic or asynchronous communications can be introduced by either of both of these wireless communication paths. The control system 500 illustrated in FIG. 5 is similar in nature to that of FIG. 4, except that the controller 100 of FIG. 5 includes additional components that are needed to deal with the potential delay or loss of communications, and/or the loss of synchronous or periodic communications within the feedback communication path between the sensor 106 and the controller 100. As will be seen, this path is now indicated with a dotted line in FIG. 5 to indicate that this communication path is wireless, non-periodic, asynchronous, and/or exhibits significant delays.

As illustrated in FIG. 5, the controller 100 includes standard PID controller elements described above with respect to FIG. 4, including a control signal generation unit having a summing block 108, a proportional gain element 110, a further summing block 112, a derivative calculation block 132, a still further summing block 134 and a high-low limiter 114. The control routine 100 also includes a feedback path including the filter 116, but in this case additionally includes an integral output switch that includes a selection block 118 coupled to a communications stack 80 and the filter 116. As illustrated in FIG. 5, the filter 116 is still coupled to receive the implied actuator position, but now provides the output of the filter 116 to the block 118 which, in turn, provides the integral or reset component of the control signal being generated by the controller 100 to the summing block 112.

During operation of the controller 100, the summing block 108 compares the setpoint signal with the most recently received process variable measurement value (provided from the communications stack 80 within the controller 100) to produce an error signal. The proportional gain element 110 operates on the error signal by, for example, multiplying the error signal by a proportional gain value $K_p$ to produce a proportional contribution or component of the control signal. The summing block 112 then combines the output of the gain element 110 (i.e., the proportional contribution) with the integral or reset contribution or component of the control signal produced by the feedback path (including the filter 116 and the block 118). The derivative component block 132 operates on the output of the summer 108 (the error signal) to produce a derivative component of the control signal which is added to the output of the summer 112 by the summer 134. The limiter block 114 then performs high-low limiting on the output of the summer 134 to produce the control signal 105, which is provided to the control communication block 135. The block 135 operates in the manner described above with respect to FIG. 4 to determine when a new control signal 105 is to be sent to the actuator 102 via the wireless link 103 (that may experience significant delays).

In this case, the filter 116 and the block or switch 118 within the feedback path of the controller 100 operate to produce the integral or reset contribution component of the control signal in the following manner. The filter 116, which is coupled to receive the output of the limiter 114, produces an indication of the expected process response to the control signal 105 based on the implied actuator position and the execution period or time of the control algorithm 100 as described above with respect to FIG. 4. However, in this case, the filter 116 provides this expected process response signal to the switch or block 118. The switch or block 118 samples and clamps the output of the filter 116 at the output of the switch or block 118 whenever a new process variable measurement value has been received at the controller 100 (as determined by the communication stack 80) and maintains this value until the next process variable measurement value is received at the communications stack 80. As such, the output of the switch 118 remains the output of the filter 116 that was produced at the time that the controller 100 received the last process variable measurement update.

More particularly, the control technique illustrated in FIG. 5 calculates an indication of an expected response via the continuously updated filter 116 (e.g. the reset contribution filter) for each execution of the control block or routine 100. However, to determine if the output of the filter 116 should be used as an input to the summing block 112, the communications stack 80 and, in some examples, the update detection module 82 (FIG. 3), process the incoming data from the transmitter 106 to generate a new value flag for the integral output switch 118 when a new process variable measurement value is received. This new value flag informs the switch 118 to sample and clamp the output of the filter 116 for this controller iteration and provide this value to the input of the summer 112.

Regardless of whether a new value flag is communicated, the continuously updated filter 116 continues to calculate an indication of an expected response for each iteration of the control routine. This new indication of an expected response is delivered to the integral output switch or block 118 each execution of the control block. Depending on the presence of the new value flag, the integral output switch 118 switches between allowing the new indication of the expected response from the continuously updated filter 116 to pass through to the summing block 112 and maintaining the signal that was previously delivered to the summing block 112 during the last execution of the control block. More particularly, when a new value flag is communicated, the integral output switch 118 allows the most recently calculated indication of the expected response from the continuously updated filter 116 to pass to the summing block 112. Conversely, if the new value flag is not present, then the integral output switch 118 resends the indication of the expected response from the last control block iteration to the summing block 112. In this manner, the integral output switch 118 clamps onto the new indication of the expected response each time a new value flag is communicated from the stack 80, but does not allow any newly calculated indication of the expected response produced by the filter 116 to reach the summing block 112 if a new value flag is not present.

Thus, as will be understood, the use of the block 118 enables the continuously updated filter 116 to continue to model the expected process response regardless of whether a new measurement value is communicated. If the control output changes as a result of a setpoint change or a feed-forward action based on a measured disturbance, irrespective of the presence of a new value flag, the continuously updated filter 116 correctly reflects the expected process response by calculating a new indication of an expected response at each control routine iteration. However, the new indication of the expected response (i.e. the reset contribution or integration component) will only be incorporated into the controller calculations when a new value flag is communicated (via the integral output switch 118).

Thus, generally speaking, the control routine 100 of FIG. 5 produces an expected process response by basing its calculations on the non-periodic, delayed or asynchronous measurement values received at the communications stack 80 while, in addition, determining the expected response between the receipt of two measurement values to account for changes caused by a change in the setpoint or any measured disturbance used as a feed-forward input to the controller 100. As such, the control technique described above is able to accommodate for setpoint changes, feed-forward action on measured disturbances, etc., that may affect the expected process response and thus provide a more robust control response in the presence of communication delays associated with the communication of both the control signal to the actuator 102 and the receipt of feedback or measured process variable signals at the controller 100.

Moreover, as indicated in FIG. 5, the communications stack 80 provides the most recently received feedback signal to the summer 108 for use in calculating the error signal at the output of the summer 108. As also illustrated in FIG. 5, the new value flag produced by the communications stack 80 is also provided to the derivative calculation unit 132 and may be used to indicate when the derivative calculation unit should recalculate or operate to produce the derivative control component. For example, the derivative contribution block 132 may be restructured to be based on the elapsed time since the last measurement update. In this manner, a spike in the derivative contribution (and the resultant output signal) is avoided.

More particularly, to accommodate unreliable or delayed transmissions in the feedback communications path, and, more generally, the unavailability of measurement updates, the derivative contribution may be maintained at the last determined value until a measurement update is received, as indicated by the new value flag from the communications stack 80. This technique allows the control routine to continue with periodic execution according to the normal or established execution rate of the control routine. Upon reception of the updated measurement, the derivative block 132, as illustrated in FIG. 5, may determine the derivative contribution in accordance with the following equation:

$$O_D = K_D \cdot \frac{e_N - e_{N-1}}{\Delta T}$$

where $e_N$=Current error
$e_{N-1}$=Last error
$\Delta T$=Elapsed time since a new value was communicated
$O_D$=Controller derivative term
$K_D$=Derivative gain factor With this technique for determining the derivative contribution, the measurement updates for the process variable (i.e., control input) can be lost for one or more execution periods without the production of output spikes. When the communication is reestablished, the term $(e_N-e_{N-1})$ in the derivative contribution equation may generate the same value as that generated in the standard calculation of the derivative contribution. However, for a standard PID technique, the divisor in determining the derivative contribution is the execution period. In contrast, the control technique described herein utilizes the elapsed time between two successively received measurements. With an elapsed time greater than the execution period, the control technique produces a smaller derivative contribution, and reduced spiking, than a standard PID technique.

To facilitate the determination of the elapsed time, the communications stack 80 may provide the new value flag described above to the derivative block 132 as shown in FIG. 5 along with the elapsed time between the two most recently received values. Moreover, the process measurement may be used in place of the error in the calculation of the proportional or derivative component. More generally, the communication stack 80 may include or incorporate any software, hardware or firmware (or any combination thereof) to implement a communications interface with the process 101, including any field devices within the process 101, process control elements external to the controller, etc.

As a further example, FIG. 6 illustrates a process control system 600 that is similar in nature to those described above with respect to FIGS. 4 and 5, in that it implements a control communication block 135 as described above, but does so in a control system configuration that includes wired communication paths (or other synchronous, periodic or non-delayed communication paths) between the controller 100 and the actuator 102 and between the transmitter 106 and the controller 100. In the system of FIG. 6, the continuously updated filter 116 may be directly connected to receive the implied actuator value and may be connected to provide its output directly to the summer 112. Moreover, the process variable measurement from the transmitter 106 may be directly connected to the summer 108. Here, the control communications block 135 may be provided to reduce the number of controller updates (control signals) sent to the actuator 102 to reduce actuator moves. Thus, as illustrated in FIG. 6, the control communications block 135 may operate in the manner described above in a wired or non-delayed communications network to reduce the "hunting" phenomena seen in many situations, and/or to reduce other excessive movements of the actuator 102, even when in the presence of synchronized, periodic or non-delayed control and feedback communications. In still another case not illustrated in the figures, the control communication block 135 may be used in a situation in which wireless communications (and thus potentially slow, unsynchronized, delayed or non-periodic communications) are provided between a transmitter or sensor and the controller and wired (or synchronous, periodic or non-delayed) communications are provided between the controller and the actuator in a control loop.

Additionally, while the control communications block 135 is illustrated as being within the controller block 100, the control communications block 135 (or the functionality associated therewith) could be implemented at any point between the controller output and the controlled device receiving the non-periodic controller output as produced by the block 135. For example, the block 135 may be incorporated into the control loop or at any point along the control signal path after the PID output is calculated and before this signal is received at the actuator or other controlled device. For example, the non-periodic control communications of the block 135 could be incorporated into an output block that follows the PID controller, in a gateway device, or in any other device disposed within the control signal communication path between the controller and the actuator being controlled. If desired, this functionality could be even implemented in the actuator itself.

Figure 7:
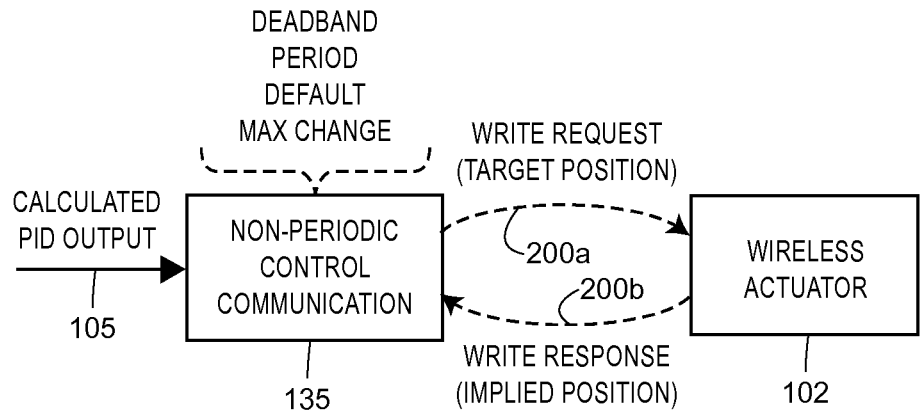
FIG. 7 is a block diagram illustrating a process of using write requests and write response signals to effectuate the non-periodic control communications of FIGS. 4-6.

A key to utilizing the non-periodic control communications block 135 as described herein is that the PID reset calculation is implemented using a positive feedback network that is based on the implied valve position that is, in turn, communicated to the controller from the actuator preferably with minimal delay. Ideally the feedback of the implied valve position (i.e., the target position that the valve actuator accepted and is working to achieve) would be communicated by the wireless actuator back to the wireless gateway in the response to a target position write request. Such a system is illustrated in FIG. 7. In particular, as illustrated in FIG. 7, during operation, the control communication block 135 sends a write request including a new control target to the wireless actuator 102 via a wireless path (e.g., a delayed or asynchronous communication link), as illustrated by the dashed line 200*a*. Thereafter, when the wireless actuator 102 receives the new control signal or target, the wireless actuator 102 responds to the block 135 (via a wireless link as illustrated by the dashed line 200*b*) with a write response indicating that the actuator 102 has received the control signal. The write response is essentially an acknowledgement of the receipt of the control signal. Moreover, the write response (to the write request) may reflect the accepted control or target value. Upon receipt of the write response, the block 135 may change the implied actuator position to the position indicated by the control signal which was sent in the write request or by the accepted target value indicated in the write response. The control block 135 may thus be involved in sending the implied actuator position to the filter 116 of FIGS. 4-6 for use as the implied actuator position. Of course, the write request or the acknowledgement in the form of a write response may be implemented using any devices within the communication link between the controller and the actuator, such as a gateway device (e.g., the gateway 73 of FIG. 3).

In some implementations of wireless communications, there may be a significant delay between the actuator 102 receiving a command to change target position and the actuator response being communicated back to and being accessible by the controller (or the block 135). In this case, the controller is limited by the operation of the block 135 from sending a new control signal until after receipt of the acknowledgment from the actuator. To enable the controller 100 to automatically compensate for this significant and variable delay in the wireless communications of the write response, a new control signal data format may be used to support control using a wireless actuator, such as a wireless valve actuator.

In particular, a time-to-apply field may be added to the control signal when sending the control output value to the wireless actuator. This field may specify a time in the future when the output value should take effect or should be put into effect by the actuator. Preferably, the delay time should be set so that both the output communication to the actuator and the readback communication to the controller are completed before this future time. In other words, the time in the future at which the actuator is to implement the change to effect movement to the control signal target value will preferably be a time equal to or greater than the expected delay introduced into the communications by one or both of the communication of a new control signal by the block 135 to the actuator and/or the communication of the acknowledgement or write response from the actuator to the block 135 or to the controller 100. Using this command, however, makes it possible to precisely calculate the implied actuator position based on the target position communicated to the actuator and the time specified when the actuator should take action on the new target position. For example if the time specified in the output is always a fixed number of seconds, Y, in the future, then the implied actuator (or valve) position can be calculated in the controller 100, the gateway, etc., simply by delaying the target position by Y seconds. Thus, the calculated implied actuator position will match the target value used in the actuator as long as the delay time specified in the new command is equal to or longer than the time required to communicate a new target position to the actuator (and possibly to receive the acknowledgement of the receipt of that target from the actuator). To insure that the calculated implied actuator position accurately reflects the target position in the actuator, a new output can be issued to the actuator only if confirmation of last communication has been received.

Thus, generally speaking, the new command may contain one or more new target value(s) and the time(s) at which the actuator or valve should take action on the new request. In this case, when the valve or actuator receives a new request, it waits until the scheduled time to take action on the new target value(s). However, when the valve or actuator receives a new command, it immediately makes an effort to send a response that contains an acknowledgement and/or that contains the new target value(s) (to thereby confirm receipt and to produce a new implied actuator position) even before the valve takes action on the new target value(s). This command reduces or alleviates the problems associated with the block 135 (or the controller using the filter 116) receiving significantly delayed implied actuator position values, and thus provides for better control in these circumstances. In fact, to minimize the impact of this communication delay, it is proposed that such a new command be used when performing control with a wireless valve, and that the implied actuator position used in the feedback loop of the controller be based on the target value sent to the valve, delayed by the time between the time for action in the command and the time at which the new target value was buffered to be sent to the valve. The external reset value used in the controller could thus be calculated in the communications layer or in the control module and could be provided as the "implied valve position" for use as the PID external reset value (e.g., as the input to the filter 116). In either case, however, it is desirable to wait to issue a new control command until a confirmation is received from the valve that the valve or actuator has received the previous command sent to the valve.

Of course, the time value used in this command can be based on the time at which the new target value was accepted at the block 135 plus a preconfigured delay time. The delay time may be set by, for example, a user, a configuration engineer, a manufacturer, etc., or may be based on a statistical property of the communication link (e.g., an average delay, a median delay, a maximum delay measured or observed within the communications link over a particular period of time, one more standard deviations of the expected delay based on numerous delay measurements, etc.)

Figure 8:
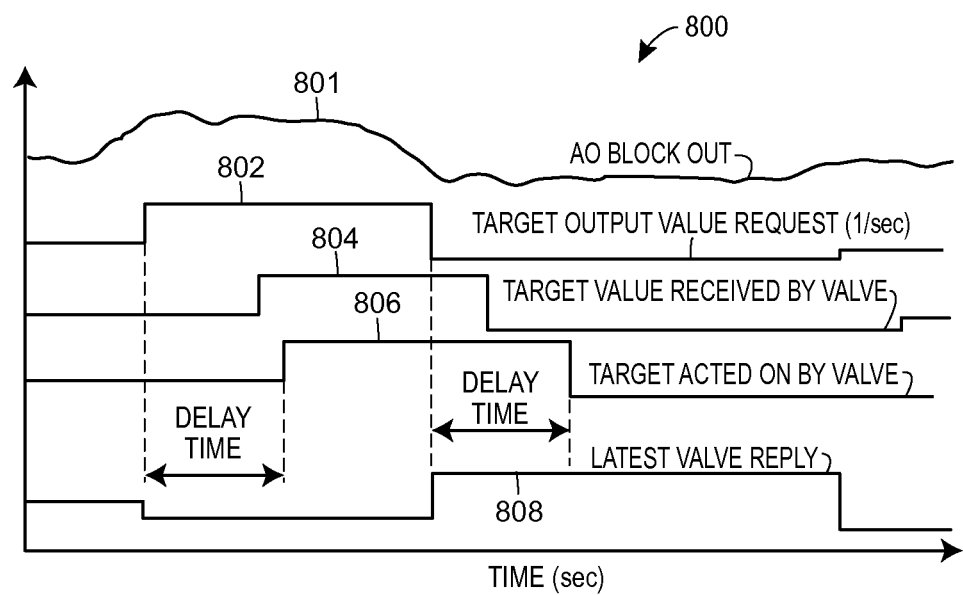
FIG. 8 illustrates a timing diagram of a set of signals used to effectuate communication of a control signal from a controller to a controlled device using the control communication techniques described herein, including a control signal specifying a time-to-apply a control move.
Figure 9:
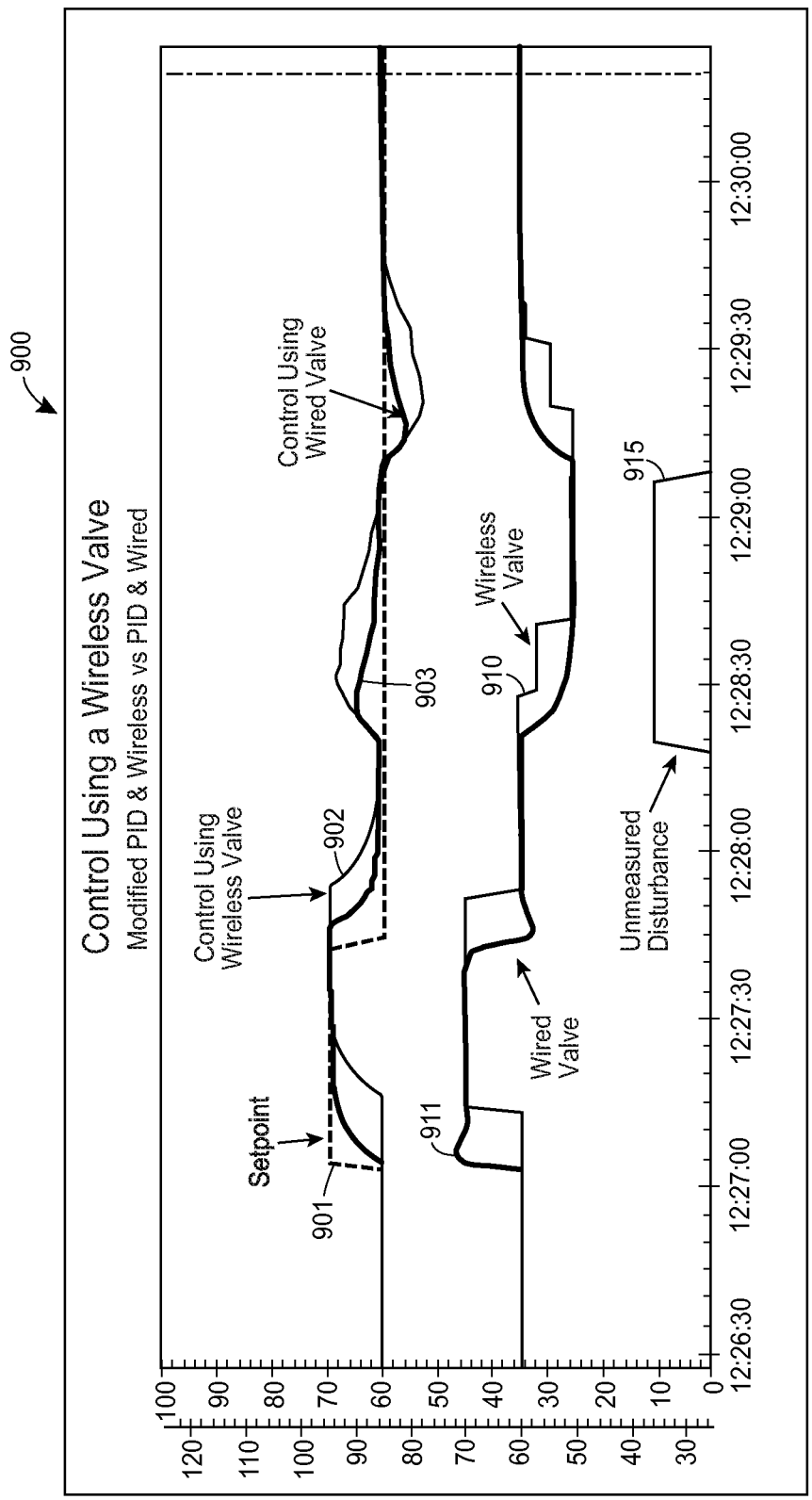
FIGS. 9 and 10 illustrate graphs of various parameters associated with two process control simulations implemented using the control communication techniques described herein and of those same parameters in similar control systems that use typical wired or periodic control communications.
Figure 10:
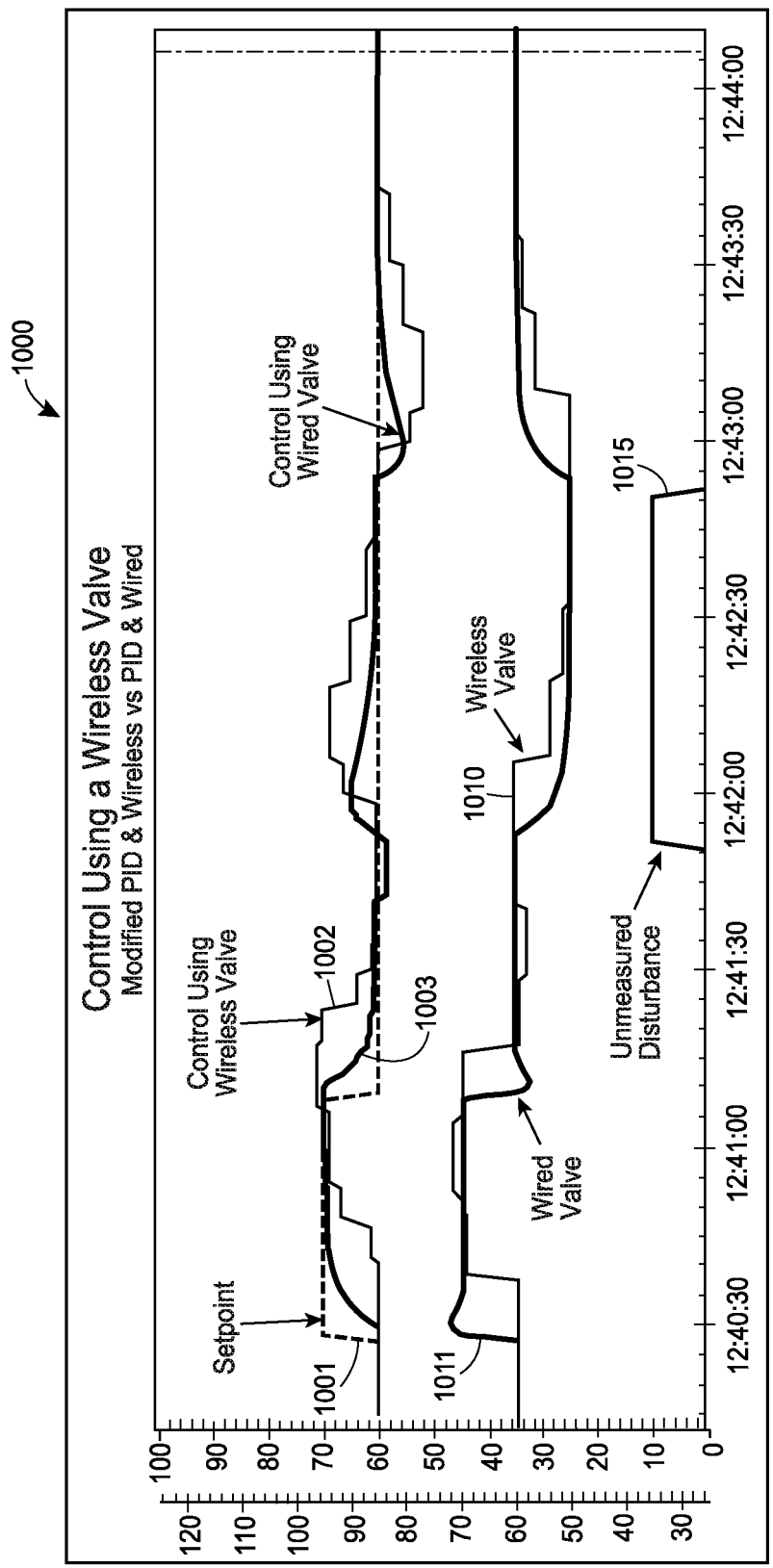

As an example of the operation of such a command, FIG. 8 illustrates a timing diagram 800 of various signals involved in a communication procedure in which an AO output block is processed to produce a control signal with a new target value, the new target value is communicated to a valve (or actuator) and is then acted on by the valve or actuator. In the example of FIG. 8, a line 801 represents the control signal developed by the control routine and provided as an input to the control communication block 135. A line 802 represents the generation of the target output or output control signal provided by the control communication block 135 to the actuator. A line 804 represents the receipt of the new target value at the actuator and may correspond to the sending of an acknowledgement receipt of the target value by the actuator (valve) back to the controller. A line 806 represents the timing of the operation of the actuator or valve in response to the control signal and illustrates a delay time of the control signal as being greater than the time it took to for a change in the target value in the line 802 to reach the actuator. The last line 808 represents the latest valve reply as received by the block 135. Note that the block 135, due to the operation explained above, will not issue a new control signal or a changed control signal until it receives a write response indicating the that the actuator (valve) received the previous control signal, which is why the changes in the line 808 correspond in time (or nearly in time) to the changes in the issuance of a new control signal from the block 135 (indicated by the line 802).

In any event, the use of this delay time as part of the control signal enables the controller to change the implied actuator position used in the feedback calculations (e.g., in the filter 116 described above) at the same time or at nearly the same time that the actuator actually acts on a control signal to move toward a new target value, even in the presence of significant communication delays between the controller and the actuator. This operation more closely synchronizes the control feedback calculations with the actual operation of the valve, and thereby provides for better or more robust control operation.

Table I below provides a definition of an example WirelessHART custom command defined for a wireless position monitor that implements this delay time concept. The command illustrated in Table I writes an output value or values (defined in bytes 3 and 4 for one or more parameters identified in bytes 0 and 1) to the monitor (e.g., actuator), and includes a time-to-apply field (in bytes 6-13). The time-to-apply field may indicate an offset or a delay time from some specified timestamp (e.g., the timestamp associated with sending of the control signal from the block 135), an absolute time as determined by a system clock that may be synchronized across different devices within the process control communications network, an offset time from a system clock, etc. Moreover, if desired, the new command may send multiple control signals to apply simultaneously or in sequence at different offset times or at the same offset times. The number of commands may be provided in, for example, the second byte as indicated in Table I.

TABLE I

| HART Cmd | Byte | Format | Command Definition Description |
|---|---|---|---|
| 64387 | 0-1 | Unsigned-16 | Index of first Discrete Variable to Write (1) |
| | 2 | Unsigned-8 | Number of Discrete Variables to write (1) |
| | 3-4 | Unsigned-16 | First Discrete Variable Value (5-Open, 6-Closed) |
| | 5 | Bits-8 | First Discrete Variable Status (Don't care) |
| | 6-13 | Unsigned-64 | Time-to-apply in UTC (ms) |

In any event, using this data format for valve or other actuator control results in or is equivalent to having a zero readback or acknowledgement delay, as long as the control system and the wireless network have a common sense or measurement of time for this command, and the delay time specified in the command is greater than the one-way or round trip delay of the write request and the write response.

Two sets of tests were performed to demonstrate the functionality of the control and communication system described herein. The first set of tests was conducted assuming minimal response (acknowledgement) delay and the second set of tests was conducted to include significant response delay, which was mitigated using the time-to-apply concept as part of the control signal, as described above. Each of the tests described herein was performed using a simulated process control system.

In the set of tests using minimal response delay, a total of eight tests were conducted to demonstrate that PID control using non-periodic communications to a wireless valve is an effective means for reducing the number of communications to the valve. A simulation of the control, communication and process response was created to allow the performance of a control system with non-periodic control communications being sent to a wireless valve to be compared to a traditional PID control system using a wired valve. In these tests, a significant delay was included in communications from the controller to the valve, but confirmation that the valve received the message was received with minimal delay. The process gain and dynamics and PID tuning were identical for these eight tests and was used as follows.

| Process | PID Tuning |
|---|---|
| Gain = 1 | GAIN = 1 |
| Time Constant = 6 sec | RESET = 8 sec/repeat |
| DT = 2 sec | RATE = 0 |

The same setpoint changes (10%) and unmeasured load disturbances changes (10%) were introduced in each of these tests. The test conditions are summarized in Table II.

TABLE II

Wireless Valve Non-periodic Communication

| Test | Deadband | Period | Default | Max Change | Measurement |
|---|---|---|---|---|---|
| 1 | 3% | 2 sec | 8 sec | | Wired |
| 2 | 3% | 10 sec | 30 sec | | Wired |
| 3 | 1% | 2 sec | 8 sec | | Wired |
| 4 | 1% | 10 sec | 30 sec | | Wired |
| 5 | 1% | 2 sec | 8 sec | 1.5% | Wired |
| 6 | 1% | 10 sec | 30 sec | 1.5% | Wired |
| 7 | 1% | 2 sec | 8 sec | | Wireless |
| 8 | 1% | 10 sec | 30 sec | | Wireless |

The results of these tests are summarized in Table III.

TABLE III

| | Number of New Target Values | | Integral Absolute Error (IAE) | | Total Valve Travel (%) | |
|---|---|---|---|---|---|---|
| Test | Wireless Valve | Wired Valve | Wireless Valve | Wired Valve | Wireless Valve | Wired Valve |
| 1 | 25 | 363 | 416 | 332 | 41.4 | 51.1 |
| 2 | 8 | 353 | 553 | 328 | 39.7 | 51 |
| 3 | 25 | 266 | 345 | 317 | 47 | 50.7 |
| 4 | 10 | 401 | 581 | 333 | 40.1 | 51.2 |
| 5 | 41 | 353 | 509 | 330 | 42.7 | 51.1 |
| 6 | 22 | 713 | 1179 | 339 | 39.8 | 51.3 |
| *7 | 30 | 369 | 463 | 333 | 46.4 | 51.1 |
| *8 | 13 | 594 | 763 | 339 | 40.7 | 51.3 |

*Wireless transmitter used with wireless valve

Using the proposed changes in the PID (i.e., with the reset calculation being based on the implied valve position communicated by the wireless valve and with the use of non-periodic communications to the wireless valve), the number of communications to the valve was greatly reduced, as indicated in Table III. In most cases the control performance was still acceptable. The response during test 4 is illustrated in a graph 900 of FIG. 9, and is typical of that seen during these tests. In particular, the first set of lines in the graph 900 indicate the setpoint value 901, the measured controlled variable obtained using a wireless valve 902 (with the control and communication procedures described herein), and the measured controlled variable obtained using a wired valve 903 (and a typical PID control routine). The second set of lines indicates the valve movements or valve position for the wireless valve 910 (using the control and communication procedures described herein) and the valve position for the wired valve 911 (using a typical PID control routine). The bottom line 915 is an unmeasured disturbance introduced for simulation purposes. As such, the graph 900 indicates the comparative performance of the process control loop using the control and communication procedures described herein for test 4 in response to both setpoint changes and unmeasured disturbances in the process.

Moreover, as a further test, the control and communications simulations performed in some of the tests described above were modified to utilize the new control signal data format that allows for significant communication delays between the controller and the valve and significant delays in the communication of the valve response or acknowledgement. Tests 9-12 were performed using this modified simulation which included significant communication delays in the feedback path between the actuator and the controller. The same process gain and dynamics and controller tuning as were used in the previous tests were used for these additional tests.

In the tests 9 and 10, a wired measurement and a wireless valve are compared to a wired measurement and a wired valve. In tests 11 and 12 a wireless measurement with the wireless valve are compared to a wired measurement and a wired valve. During these tests identical changes in setpoint and unmeasured disturbances were introduced into both control loops. The setup of the non-periodic communication to minimize valve movement, the communication delay to the valve and the communication delay in the valve response are shown in the Table IV.

TABLE IV

| | Minimize Valve Movement | | | Communications | |
|---|---|---|---|---|---|
| Test | Deadband | Period | Default Time | Command Delay | Reply Delay |
| 9 | 3% | 6 sec | 12 sec | 3 sec | 3 sec |
| 10 | 3% | 6 sec | 12 sec | 6 sec | 6 sec |
| 11 | 3% | 6 sec | 12 sec | 3 sec | 3 sec |
| 12 | 3% | 6 sec | 12 sec | 6 sec | 6 sec |

The results achieved for wireless control using the modifications for the wireless valve versus a wired transmitter and valve using typical PID control are summarized in Table V.

TABLE V

| | Wired Valve | | | Wireless Valve | | |
|---|---|---|---|---|---|---|
| Test | Target Changes | Total Travel | IAE | Target Changes | Total Travel | IAE |
| 9 | 323 | 51 | 327 | 14 | 40 | 681 |
| 10 | 356 | 51 | 332 | 14 | 42 | 739 |
| 11 | 397 | 51 | 335 | 17 | 40 | 834 |
| 12 | 389 | 51 | 334 | 16 | 47 | 929 |

The test results illustrate that it is possible to minimize the impact of communication delay by using the proposed new output data signal format in conjunction with the calculated implied valve position for the external reset. Stable control was observed for changes in setpoint and load disturbances using the wireless valve. The number of changes in valve target were reduced by a factor of 23 times. The response during test 10 is illustrated in a graph 1000 of FIG. 10, and is typical of that seen during these tests. The first set of lines in the graph 1000 indicate the setpoint value 1001, the measured controlled variable using a wireless valve 1002 (with the control and communication procedure described herein), and the controlled variable using a wired valve 1003 (and a typical PID control routine). The second set of lines indicates the valve movements or valve position for the wireless valve 1010 (with the control and communication procedure described herein) and the valve position for the wired valve 1011 (using a typical PID control routine). The bottom line 1015 is an unmeasured disturbance. As such, the graph 1000 indicates the comparative performance of the process control loop using the control and communication procedures described herein for test 10 in response to both setpoint changes and unmeasured disturbances in the process.

As another experiment, a WirelessHART network was simulated using a WirelessHART module in a lab setting to act as both a sensor and an actuator. A simulated process was run inside the module to relate the values of the sensor and the actuator. Because an actual wireless network was used, it is believed that the experiment closely represents real world applications.

To better understand this experiment, the relevant components of the DCS (distributed control system) with a WirelessHART network and the modifications that were made thereto to perform the experiment will be described. In particular, the test DCS included a WirelessHART network that used all WirelessHART devices that were input devices. The devices published data to the gateway, which cached the data and forwarded the data to the host upon request. In the DCS system used, the component talking to the gateway was called a PIO. The control modules, including the PID, talked to the PIO. The gateway responded to any other requests from the PIO immediately with a Delayed Response (DR) status whenever it could not send a requested response. The gateway then forwarded the request to the controlled device within the WirelessHART network. Thus, the PIO had to ask the gateway repeatedly, and get a DR repeatedly, until the response from the controlled device was received by the gateway, which then finally replied without a DR signal. This mechanism applied to the output writes to the actuator. However, it could happen that a future WirelessHART standard will allow unacknowledged request from the PIO to the device, i.e., downstream publishing.

The control communication component, similar to that described above for the block 135, was implemented in the PIO in this experiment. Additionally, the HART write command was used to write an output to the valve using the time-to-apply concept described above. The target valve position maintained by the wireless valve was thus changed using the HART command with a delayed or time-to-apply component. If the target valve position specified in the command was a different value than that contained in the previous change request issued to the gateway, then this command was considered to be a new request. If the gateway had previously received a wireless valve response to the last requested change in position, then the gateway acted on the new change request. Otherwise the new change request was buffered by the gateway. To insure that the latest PID output was used and communicated to the valve with minimal delay, the non-periodic communications implemented by the controller (the PIO block) were designed to observe the following conditions:

(1) The PID block executed much faster than the time required for the gateway to communicate a new target value to the valve and to receive a response.

(2) Each time the PID executed (once per second or faster), a change request command was sent to the PIO. However, if the same command (same target value) was sent to the PIO, then the associated valve response was returned. The associated target value was reflected in the AO block READ_BACK parameter.

(3) If a status of the AO block READ_BACK parameter changed to Bad Communication Failure, then the same change request was continued to be transmitted to the gateway and was considered to be a new command.

A communication diagram illustrating a change in the PID output after application of the non-periodic control communication block in this experiment is illustrated in the Table VI.

TABLE VI

| | Controller | | | | |
|---|---|---|---|---|---|
| Step | AO/ READBACK | AO/ OUT | PIO | Gateway | Wireless Valve |
| 1 | 40 GoodNC | 40 | | <=Reply 40 | |
| 2 | 40 GoodNC | 50 | Write 50=> | | |
| 3 | 40 GoodNC | 50 | | <=Reply DR | |
| 4 | 40 GoodNC | 50 | Write 50=> | | |
| 5 | 40 GoodNC | 50 | | <=Reply DR | |
| 6 | 40 GoodNC | 50 | | Write Cmd=> | |
| 7 | 40 GoodNC | 50 | Write 50=> | | |
| 8 | 50 GoodNC | 50 | | <=Reply DR | |
| 9 | 50 GoodNC | 50 | | | <=Reply 50 |
| 10 | 50 GoodNC | 50 | Write 50=> | | |
| 11 | 50 GoodNC | 50 | | <=Reply 50 | |
| 12 | 50 GoodNC | 52 | Write 52=> | | |
| 13 | 50 GoodNC | 52 | | <=Reply DR | |

As illustrated in Table VI, at step 2, a new change request was issued by the controller AO/Out block and by the PIO to change the valve target to 50. The immediate response of the gateway was to reply with a DR (delayed response) signal. One second later, at step 4, the same change request was again issued to the gateway. The gateway then issued the HART command to the valve (to change the valve target at the valve) at step 6, but did not receive a reply (write response) until step 9. However, at step 8, after the delay time provided in the original control command to the valve, the change request was reflected in the AO/READBACK value to be used in the PID positive feedback network of the controller as the implied valve position. At step 11 (in response to the control command being re-issued at the step 10), the target valve position returned by the valve to the gateway (at step 9) was returned to the PIO. Thereafter, a new change in the PID output was issued by the PIO at step 12, all as shown in Table VI.

If, as a hypothetical, the communication from the gateway to the valve was lost following step 6, then, after a period of time, the loss of valve response would have been detected by the gateway and this failure would have been indicated in the response to the next controller write request. This failure would have then been indicated by the AO/READBACK status changing to Bad Communications. The next controller write after the detection of a communication would have then been treated as a new write request. However, the AO/READBACK would have continued to show a status of Bad Com until a response from the valve was received in response to the repeated change request.

In a general sense controller or PID modifications discussed above for control using a wireless valve may also be applied in a PID controller using a wired valve, so as to minimize valve wear by reducing the frequency of changes in the target valve position. To address such applications, the non-periodic communication function may be incorporated into the PID or IO function blocks, and the implied valve position may be based on the control signal value output to the valve. Moreover, the criteria that are used to determine if the calculated PID output should be communicated to the wireless valve could also include or consider the rate at which the calculated controller output is changing. In some cases this feature would allow faster reaction of unmeasured process disturbances. Still further, as part of the non-periodic control communication functions described herein, filtering could be applied to the calculated control output before applying the control communications criteria discussed herein to determine if a new control value should be communicated. Likewise, a metric that shows the number of changes in valve position and total valve travel may be incorporated into the control system, such as into a wireless gateway, a wireless valve, etc., to determine the effectiveness of the non-periodic control communications in reducing the frequency of changes in the target valve position.

As a general matter, practice of the control techniques described herein are not limited to use with single-input, single-output PID control routines (including P, PI and PD routines), but rather may be applied in a number of different multiple-input and/or multiple-output control schemes, cascaded control schemes or other control schemes. More generally, the control techniques described herein may also be applied in the context of any closed-loop model-based control routine (such as a model predictive control routine) involving the use or generation of one or more process output variables, one or more process input variables or other control signals, The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices such as valves, switches, flow control devices, etc.

It should be noted that any control routines or modules described herein may have parts thereof implemented or executed in a distributed fashion across multiple devices. As a result, a control routine or module may have portions implemented by different controllers, field devices (e.g., smart field devices) or other devices or control elements, if so desired. Likewise, the control routines or modules described herein to be implemented within a process control system may take any form, including software, firmware, hardware, etc. Any device or element involved in providing such functionality may be generally referred to herein as a "control element," regardless of whether the software, firmware, or hardware associated therewith is disposed in a controller, field device, or any other device (or collection of devices) within the process control system. A control module, routine or block may be any part or portion of a process control system including, for example, a routine, a block or any element thereof, stored on any computer readable medium to be executed on a processor. Such control modules, control routines or any portions thereof (e.g., a block) may be implemented or executed by any element or device of the process control system, referred to herein generally as a control element. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controllers 11 described herein may be configured to implement a control strategy or control routine in any desired manner.

Alternatively or additionally, function blocks may be stored in and implemented by the field devices themselves, or in other control elements of a process control system, which may be the case with systems utilizing Fieldbus devices. While the description of the control systems are generally provided herein using a function block control strategy, the control techniques and system may also be implemented or designed using other conventions, such as ladder logic, sequential function charts, etc., or using any other desired programming language or paradigm.

When implemented, any of the software described herein may be stored in any computer readable memory such as on a magnetic disk, a laser disk, or other storage medium, in a RAM or ROM of a computer or processor, a flash memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. Furthermore, this software may be provided directly without modulation or encryption or may be modulated and/or encrypted using any suitable modulation carrier wave and/or encryption technique before being transmitted over a communication channel.

Thus, while the present invention has been described with reference to specific examples, which are intended to be illustrative only and not to be limiting of the invention, it will be apparent to those of ordinary skill in the art that changes, additions or deletions may be made to the control techniques described herein without departing from the spirit and scope of the invention.

The invention claimed is:

1. A method of controlling a controlled device within a process using a control signal, comprising:
   implementing, on a process controller computing device, multiple iterations of a control routine to generate, during each of the multiple iterations, a control signal value for controlling the controlled device; and
   implementing a communications routine within a computer processing device coupled to the process controller computing device including, during each of the multiple iterations of the control routine,
  determining if a minimum predetermined communication time period has passed, and
  determining if an acknowledgement has been received from the controlled device indicating that the controlled device has received a previous control signal;
  and, at least when the minimum predetermined communication time period has passed and the acknowledgement has been received from the controlled device indicating that the controlled device has received the previous control signal, determining if a further signaling condition is met; and
  sending a new control signal to the controlled device via a communications link only when the minimum predetermined communication time period has passed and the acknowledgement has been received from the controlled device indicating that the controlled device has received the previous control signal and when the further signaling condition is met,
  wherein sending the new control signal to the controlled device via the communications link includes sending a new control signal value and a predetermined time to implement the new control signal value at the controlled device, and
  wherein the control routine generates the new control signal based on an assumption that the controlled device implemented a previous control signal value of the previous control signal at the predetermined time to implement the previous control signal value, the new control signal generated prior to the control routine receiving an indication of a feedback signal associated with the previous control signal.

2. The method of claim 1, wherein determining if the further signaling condition is met includes determining if the difference between the control signal value generated for a control routine iteration and the value of the previous control signal sent to controlled device is greater than a threshold value.

3. The method of claim 1, wherein determining if the further signaling condition is met includes determining if the time since the previous control signal was sent to the controlled device exceeds a maximum threshold time value.

4. The method of claim 1, wherein determining if the further signaling condition is met includes determining if either the difference between the control signal value generated for a control routine iteration and the value of the previous control signal sent to controlled device is greater than a threshold value or the time since the previous control signal was sent to the controlled device exceeds a maximum threshold time value.

5. The method of claim 1, wherein implementing the communications routine within a computer processing device coupled to the process controller computing device includes implementing the communications routine during each of a multiplicity of consecutive iterations of the control routine.

6. The method of claim 1, wherein sending a new control signal to the controlled device via a communications link includes determining if the difference between the control signal value for the control routine iteration and the value of the previous control signal sent to controlled device is greater than a maximum change threshold value and sending the new control signal as a limited version of the control signal value for the control routine iteration when the difference between the control signal value for the control routine iteration and the value of the previous control signal sent to controlled device is greater than the maximum change threshold value.

7. The method of claim 1, wherein sending the new control signal to the controlled device via a communications link includes sending the new control signal to the controlled device via a wireless communications link.

8. The method of claim 1, wherein sending the new control signal to the controlled device via a communications link includes sending the new control signal to the controlled device via a wired communications link.

9. The method of claim 1, wherein sending the time to implement the new control signal value includes sending the time as an offset time.

10. The method of claim 1, wherein sending the time to implement the new control signal value includes sending the time as an absolute time.

11. The method of claim 1, wherein implementing, on the process controller computing device, multiple iterations of the control routine includes implementing a proportional, integral, derivative type control routine.

12. The method of claim 1, further including receiving the feedback signal via a wireless communication link.

13. The method of claim 1, further including receiving the feedback signal via a wired communication link.

14. The method of claim 1, wherein the indication of the feedback signal originates from a second controlled device, the second controlled device different from the controlled device.

15. The method of claim 1, wherein the indication of the feedback signal originates from the controlled device.

16. The method of claim 1, wherein an attribute of the controlled device as determined from the feedback signal is used by the control routine during a further iteration to generate a further new control signal value.

17. The method of claim 1, wherein each of the control signal and the new control signal is sent via one of: (i) a wireless transmission or (ii) a wired transmission,
  wherein the controlled device is associated a first wireless controller error value for the wireless transmission, and wherein the controlled device is associated with a wired controller error value for the wired transmission,
  wherein the control routine is configured to implement a custom command for transmitting the wireless transmission,
  wherein the custom command modifies the controlled device by reducing the first wireless controller error value to a reduced wireless controller error value of the controlled device.

18. The method of claim 17, wherein each of the control signal and the new control signal is sent via the wireless transmission, and
  wherein based on the custom command, a wireless error rate of the controlled device is equal to a wired error rate of the controlled device.

19. The method of claim 18, wherein each of the reduced wireless controller error value and the wired controller error value is an integral absolute error (IAE) value, and wherein the reduced wireless controller error value and the wired controller error value differ by no more than a value of 300 IAE.

20. The method of claim 17, wherein the custom command is a command configured for a WirelessHART-based network.

21. A process control system for use in controlling a controlled device within a process using a control signal, comprising:

a process controller that stores a control routine and that implements the control routine during multiple iterations to generate, during each of the multiple iterations, a control signal value for controlling the controlled device; and a communications routine, implemented within a computer processing device that is coupled to the process controller, wherein the communications routine receives the generated control signal value for each of the multiple iterations of the control routine and executes to:

determine if a minimum predetermined communication time period has passed, and determine if an acknowledgement has been received from the controlled device indicating that the controlled device has received a previous control signal;

and, further executes to determine if a further signaling condition is met at least when the minimum predetermined communication time period has passed and the acknowledgement has been received from the controlled device indicating that the controlled device has received the previous control signal; and sends a new control signal to the controlled device via a communications link only when the minimum predetermined communication time period has passed and the acknowledgement has been received from the controlled device indicating that the controlled device has received the previous control signal and when the further signaling condition is met, wherein the communications routine generates the new control signal as including a new control signal value and a time to implement the new control signal value at the controlled device, wherein the control routine generates the new control signal based on an assumption that the controlled device implemented a previous control signal value of the previous control signal at a predetermined time to implement the previous control signal value, the new control signal generated prior to the control routine receiving an indication of a feedback signal associated with the previous control signal.

22. The process control system of claim 21, wherein the communications routine determines if the further signaling condition is met by determining if the difference between the control signal value generated for the control routine iteration and the value of the previous control signal sent to controlled device is greater than a threshold value.

23. The process control system of claim 21, wherein the communications routine determines if the further signaling condition is met by determining if the time since the previous control signal was sent to the controlled device exceeds a maximum threshold time value.

24. The process control system of claim 21, wherein the communications routine determines if the further signaling condition is met by determining if either the difference between the control signal value generated for the control routine iteration and the value of the previous control signal sent to controlled device is greater than a threshold value or the time since the previous control signal was sent to the controlled device exceeds a maximum threshold time value.

25. The process control system of claim 21, wherein the communications routine is implemented with a computer processing device within the process controller.

26. The process control system of claim 21, wherein the communications routine determines if the difference between the control signal value for the control routine iteration and the value of the previous control signal sent to controlled device is greater than a maximum change threshold value and generates the new control signal as a limited version of the control signal value for the control routine iteration when the difference between the control signal value for the control routine iteration and the value of the previous control signal sent to controlled device is greater than the maximum change threshold value.

27. The process control system of claim 21, wherein communications routine sends the new control signal to the controlled device as a wireless communications signal.

28. The process control system of claim 21, wherein the time to implement the new control signal value is an offset time.

29. The process control system of claim 21, wherein the time to implement the new control signal value is an absolute time.

30. The process control system of claim 21, wherein the control routine is a proportional, integral, derivative type control routine.

31. The process control system of claim 21, wherein the control routine is a proportional, integral derivative (PID) type of control routine and wherein the process controller receives a feedback signal via a wireless communications link that is used as a feedback signal in the PID type of control routine.

32. A process control system for controlling a process, comprising:

a process controller including one or more processors, a memory, and a communications interface;

a communications link; and a controlled device disposed within the process and communicatively coupled to the process controller via the communications link;

wherein the process controller includes a control routine stored on the memory that executes on the one or more processors during each of a multiplicity of iterations to generate a control signal value for use in controlling the controlled device, and wherein the communications interface includes an interface routine stored on the memory that executes on the one or more processors to:

(1) determine if a minimum predetermined time period has passed since sending a previous control signal to the controlled device, (2) determine if an acknowledgement has been received from the controlled device indicating that the controlled device has received the previous control signal; and (3) determine if a further signaling condition is met; and wherein the interface routine sends a new control signal to the controlled device via the communications link based on the control signal value generated by the control routine during an iteration when (1) the minimum predetermined time period has passed since sending the previous control signal to the controlled device, and (2) the acknowledgement has been received from the controlled device indicating that the controlled device has received the previous control signal and (3) the further signaling condition is met, and does not send a new control signal to the controlled device via the communications link based on the control signal value generated by the control routine during an iteration when (1) the minimum predetermined time period has not passed since sending the previous control signal to the controlled device, or (2) the acknowledgement has not been received from the controlled device indicating that the controlled device has received the previous control signal, or (3) the further signaling condition is not met, wherein the control routine creates a new control signal as a signal including a target value and a time to implement the target value at the controlled device, and wherein the control routine creates the new control signal based on an assumption that the controlled device implemented a previous control signal value of the previous control signal at a predetermined time to implement the previous control signal value, the new control signal generated prior to the control routine receiving an indication of a feedback signal associated with the previous control signal.

33. The process control system of claim 32, wherein the interface routine determines that the further signaling condition is met if the difference between the control signal value generated for the control routine iteration and the value of the previous control signal sent to controlled device is greater than a threshold value.

34. The process control system of claim 32, wherein the interface routine determines that the further signaling condition is met if the time since the previous control signal was sent to the controlled device exceeds a maximum threshold time value.

35. The process control system of claim 32, wherein the interface routine determines that the further signaling condition is met if either the difference between the control signal value generated for the control routine iteration and the value of the previous control signal sent to controlled device is greater than a threshold value or the time since the previous control signal was sent to the controlled device exceeds a maximum threshold time value.

36. The process control system of claim 35, wherein the interface routine further determines if a difference between the control signal value for the control routine iteration and the value of the previous control signal sent to controlled device is greater than a maximum change threshold value and creates the new control signal as a limited version of the control signal value for the control routine iteration when the difference between the control signal value for the control routine iteration and the value of the previous control signal sent to controlled device is greater than the maximum change threshold value.

37. The process control system of claim 35, wherein the communications link is a wireless communications link.

38. The process control system of claim 35, wherein the communications link includes is a wired communications link.

39. The process control system of claim 35, wherein the control routine is a proportional, integral, derivative (PID) type of control routine.

40. The process control system of claim 37, wherein the time to implement the target value is an offset time.

41. The process control system of claim 32, wherein the control routine uses an additional feedback signal indicative of a measured process variable to generate the control signal value.

42. The process control system of claim 35, further including a sensor disposed within the process to measure a process variable, and a further communications link disposed between the process controller and the sensor, wherein the control routine uses the process variable measured by the sensor to determine the control signal value.

43. The process control system of claim 42, wherein the communications link and the further communications link are both wireless communications links.

44. The process control system of claim 42, wherein the communications link and the further communications link are both wired communications links.

45. The process control system of claim 42, wherein the communications link is a wired communications link and the further communications link is a wireless communications link.

46. The process control system of claim 42, wherein the communications link is a wireless communications link and the further communications link is a wired communications link.

47. A process controller for use in controlling a controlled device within a process, comprising:
a processor;
a memory;
a process control routine stored on the memory that executes on the processor during each of a multiplicity of iterations to produce a control signal value for controlling the controlled device within the process and wherein the process control routine comprises a feedback type of control routine that uses a measured attribute of the controlled device as a feedback variable to generate the control signal value; and
a communications routine stored on the memory that executes on the processor during one or more of the multiplicity of iterations to send a new control signal, based on the control signal value, to the controlled device, wherein the new control signal includes a target value for the controlled device and a time to implement the target value;
wherein the process control routine determines the measured attribute of the controlled device as the feedback variable assuming that the controlled device implemented the target value at the time to implement the target value during one or more of the multiplicity of iterations, and
wherein the process control routine determines the measured attribute of the controlled device as the feedback variable such that the process control routine is configured to assume that the controlled device implemented the target value at the time to implement the target value prior to receiving an indication of a new measured attribute of the controlled device.

48. The process controller of claim 47, wherein the process control routine comprises a proportional, integral, derivative type of control routine.

49. The process controller of claim 48, wherein the process control routine uses the feedback variable to determine a reset contribution to the control signal value.

50. The process controller of claim 47, wherein the communications routine sends the new control signal to the controlled device via a wireless communications link.

51. The process controller of claim 47, wherein the time to implement the target value is an offset time.

52. The process controller of claim 47, wherein the time to implement the target value is an absolute time.

53. A method of controlling a controlled device within a process using a control signal, comprising:
implementing, on a process controller computing device, multiple iterations of a control routine to generate, during each of the multiple iterations, a control signal value for controlling the controlled device, further including using a measured attribute of the controlled device as a feedback variable to generate the control signal value during each of the multiple iterations of the control routine;

generating a new control signal for one or more of the multiple iterations, wherein the new control signal includes a target value for the controlled device and a time to implement the target value; and sending the new control signal over a communications link to the controlled device; and further including determining the measured attribute of the controlled device as the feedback variable assuming that the controlled device implemented the target value at the time to implement the target value during one or more of the multiple iterations of the control routine, wherein the determining the measured attribute of the controlled device as the feedback variable assuming that the controlled device implemented the target value at the time to implement the target value includes: assuming the target value was implemented in at least one of the multiple iterations prior to receiving an indication of a new measured attribute value of the controlled device.

54. The method of claim 53, wherein implementing the control routine includes implementing a proportional, integral, derivative type of control routine.

55. The method of claim 54, further including using the feedback variable to determine a reset contribution to the control signal value.

56. The method of claim 53, wherein sending the new control signal over a communications link to the controlled device includes sending the new control signal via a wireless communications link.

57. The method of claim 53, wherein generating a new control signal includes generating the time to implement the target value as an offset time.

58. The method of claim 53, wherein generating a new control signal includes generating the time to implement the target value as an absolute time.

* * * * *